(12) United States Patent
Lin et al.

(10) Patent No.: US 12,149,608 B2
(45) Date of Patent: Nov. 19, 2024

(54) METHOD AND APPARATUS FOR IMPLEMENTING A WHITE-BOX CIPHER

(71) Applicant: Irdeto Canada Corporation, Ottawa (CA)

(72) Inventors: Tingting Lin, Ottawa (CA); Dafu Lou, Ottawa (CA); Manfred Von Willich, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 271 days.

(21) Appl. No.: 17/731,894

(22) Filed: Apr. 28, 2022

(65) Prior Publication Data
US 2022/0271916 A1 Aug. 25, 2022

Related U.S. Application Data

(63) Continuation of application No. 16/368,922, filed on Mar. 29, 2019, now abandoned.

(51) Int. Cl.
*H04L 9/00* (2022.01)
*G06F 16/901* (2019.01)
(Continued)

(52) U.S. Cl.
CPC ........ *H04L 9/0631* (2013.01); *G06F 16/9017* (2019.01); *G06F 16/9027* (2019.01); *H04L 9/0861* (2013.01); *H04L 63/1441* (2013.01)

(58) Field of Classification Search
CPC . H04L 9/0631; H04L 9/0861; H04L 63/1441; H04L 9/003; H04L 2209/16; G06F 16/9017; G06F 16/9027
See application file for complete search history.

(56) References Cited

U.S. PATENT DOCUMENTS

| 11,128,436 | B2* | 9/2021 | Bauer | H04L 9/0631 |
| 2004/0139340 | A1* | 7/2004 | Johnson | H04L 9/0625 |
| | | | | 380/1 |

(Continued)

OTHER PUBLICATIONS

Bai, Kunpeng, and Chuankun Wu. "A secure white-box SM4 implementation." Security and Communication Networks 9.10 (2016): 996-1006. (Year: 2016).*

(Continued)

*Primary Examiner* — Daniel B Potratz
*Assistant Examiner* — Syed M Ahsan
(74) *Attorney, Agent, or Firm* — Rimon PC; Marc S. Kaufman

(57) ABSTRACT

An apparatus method and computer media for implementing a white-box block cipher in a software application to create a secure software application having the same functionality as the software application. An implementation of a block cipher is created by: applying an isomorphism between an original finite field representation and a composite field representation, and using this isomorphism to reconstruct the cipher as operations that use only the elements of the composite field, including XOR, linear transformation and S-box; decomposing original S-box into several algebraic steps and merging some of these into other parts of the cipher; in the non-linear step of S-box, implementing the inversion in the original finite field representation with algorithm in the composite field representation; applying an initial threshold implementation of m input shares and n output shares to generate lookup tables for the non-linear step of S-box; applying further threshold implementations to different steps of the cipher to generate lookup tables. The block cipher is applied to at least a portion of the software application to create the secure software application and thereby increase security of a computing platform executing the secure software application.

10 Claims, 29 Drawing Sheets

(51) Int. Cl.
*H04L 9/06* (2006.01)
*H04L 9/08* (2006.01)
*H04L 9/40* (2022.01)

(56) References Cited

U.S. PATENT DOCUMENTS

2013/0061061 A1* 3/2013 Farrugia ............... H04L 9/0631
713/190
2016/0350560 A1* 12/2016 Hoogerbrugge ........ H04L 9/002
2017/0093571 A1* 3/2017 Satpathy ................. G09C 1/00

OTHER PUBLICATIONS

Lin, Tingting, et al. "Security evaluation and improvement of a white-box SMS4 implementation based on affine equivalence algorithm." The Computer Journal 61.12 (2018): 1783-1790. (Year: 2018).*

Li, Xinchao, and Shuangpeng Ma. "Design of a S-box for SMS4 Based on Threshold Implementation." Advances on P2P, Parallel, Grid, Cloud and Internet Computing: Proceedings of the 12th International Conference on P2P, Parallel, Grid, Cloud and Internet Computing (3PGCIC-2017). (Year: 2018).*

International Searching Authority, International Search Report and Written Opinion for International Application No. PCT/IB2020/052693 dated May 25, 2020.

Li, et al., "Design of a S-box for SMS4 Based on Threshold Implementation" 2018, Springer, Advances on P2P, Parallel, Grid, Cloud and Internet Computing, 3PGCIC 2017. Lecture Notes on Data Engineering and Communications Technologies; 2018; vol. 13; pp. 206-214.

Lin, et al. "Security Evaluation and Improvement of a White-Box SMS4 Implementation Based on Affine Equivalence Algorithm." The Computer Journal; Jul. 18, 2018; vol. 61, No. 12; pp. 1783-1790.

Luo, et al., "Compiler-Assisted Threshold Implementation Against Power Analysis Attacks" 2017 IEEE International Conference on Computer Design; 2017; pp. 541-544.

Nikova , et al., "Threshold Implementations Against Side-Channel Attacks and Glitches" Robocup 2008: Robocup 2008: Robot Soccer World Cup XII; [Lecture Notes in Computer Science; Lect.Notes Computer]; Dec. 4, 2006; pp. 529-545.

Rudra A, et al., "Efficient Rijndael Encryption Implementation with Composite Filed Arithmetic" Cryptographic Hardware and Embedded Systems. 3rd International Workshop, Ches 2001, Paris, France, May 14, 2001 Proceedings; [Lecture Notes in Computer Science]; May 14, 2001; vol. 2162; pp. 171-184.

* cited by examiner

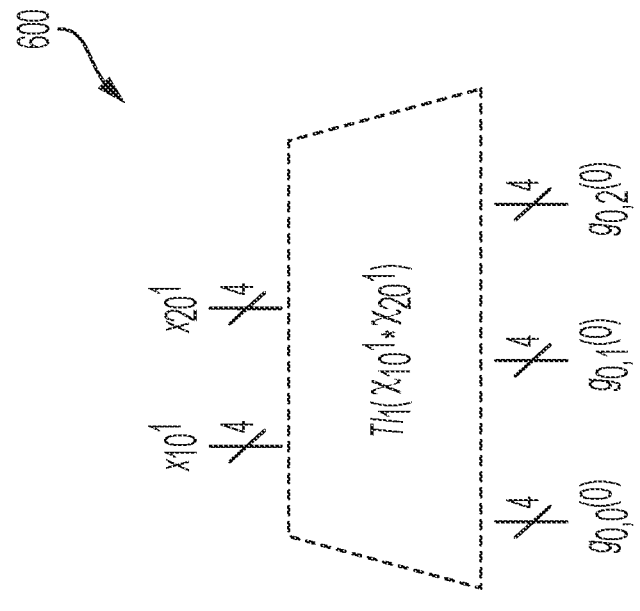
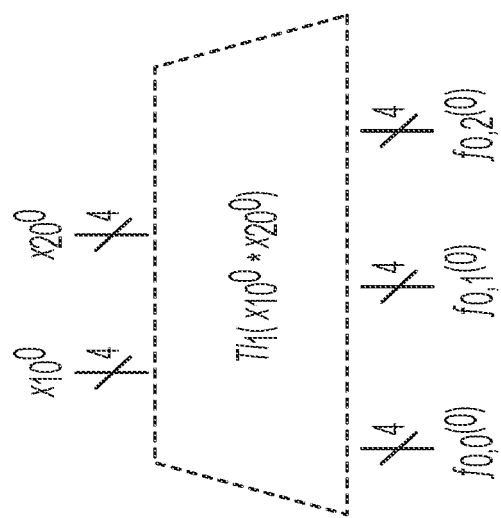
Fig. 6

METHOD AND APPARATUS FOR IMPLEMENTING A WHITE-BOX CIPHER

The present application is a continuation of U.S. Ser. No. 16/368,922, filed Mar. 29, 2019, the entire content of which is incorporated.

FIELD OF THE DISCLOSURE

The present disclosure relates to white-box security implementations and related white-box ciphers that can be applied to SM4 encoding schemes.

BACKGROUND

The term "cryptography" refers to techniques for secure communication in the presence of third parties, sometimes referred to as "adversaries" or "attackers." Various protocols that prevent third parties or the public from reading private messages can be constructed. Applications of cryptography include electronic commerce, chip-based payment cards, digital currencies, computer passwords, and content streaming. Modern cryptographic algorithms are designed around computational hardness assumptions, making such algorithms hard to break in practice by any adversary. It is theoretically possible to break such a system, but it preferably is not pragmatic to do so in order to discourage potential attackers.

The "black-box" attack model of cryptography is based on the premise that the internal operation of a cipher and the key it uses are not accessible to an adversary, who only has access to its inputs and outputs. This model underlies the development and design of most modern cryptographic algorithms, including Data Encryption Standard (DES), Advanced Encryption Standard (AES) and many others. However, this premise of black box attack models, i.e. that the internal operations of devices are not accessible to an attacker, does not apply to many real-world security problems.

The "white-box" attack model assumes a greater level of visibility and control by the adversary. The white-box attack model can be applied in many more modern implementations, where the attacker may have full visibility and control of the operation, such as in a mobile phone or personal computer that may have debugging tools or installed malware. This presents a challenge to develop countermeasures to an adversary extracting information such as cryptographic keys or influencing the operation to produce undesired results in the white-box model. As a result, the study of countermeasures to subversion in the white-box model has become increasingly important.

Chow, S., Eisen, P., Johnson, H. and Van Oorschot, P. C., *White-box cryptography and an AES implementation*, International Workshop on Selected Areas in Cryptography, pp. 250-270, (Springer, Berlin, Heidelberg, August 2002) described countermeasures to white-box attacks and thus sensitized the academic community at large to the idea that countermeasures in the white-box scenario might be feasible. The general idea of a white-box AES implementation is to hide the secret key in the S-Boxes of AES, break AES into several steps and insert secret random bijections to obfuscate every step. To keep the implementation functionally equivalent to AES, the inserted parts will be canceled out in the end. However, AES white-box implementations have been successfully attacked. In 2004, Billet, Gilbert and Ech-Chatbi presented an efficient attack (referred to as the BGE attack) on and AES white-box implementation. The BGE attack extracted the embedded AES key with a work factor of $2^{30}$ the attacks, and thus is a pragmatic attack.

Many dedicated white-box implementations are known. Some implement a standard cipher in a white-box attack context and some focus on the designs of various nonstandard ciphers which are expected to be secure under white-box attack. Such ciphers are referred to as "white-box ciphers." However, research on cryptanalysis against white-box implementations has made significant progress. Some attacks are unique to the white-box model, because they require detailed structure for analysis. This includes algebraic attacks such as the BGE attack. Additionally, in some scenarios, a "lifting attack" is possible because the key does need to be determined since the lifted algorithm may be used as an oracle and sources of randomness can be overridden.

"Gray-box" attacks such as DPA (Differential Power Analysis) have been repurposed under the name DCA (Differential Computation Analysis) and could be reassessed for effectiveness in white-box scenarios. For example, the advantage of a simple sharing scheme that increases the number of traces that must be collected for analysis as the power of the number of shares is lost when there is no noise, as is the case in the white-box scenario. Some benefits of these countermeasures are retained. Any well-designed sharing scheme, including a threshold scheme applied for combating leakage due to hardware glitches, provides some advantage since identifying information leakage is made more complex through the hiding of direct correlations.

Due to its prevalence, AES has been the focus of analysis and countermeasures, and several white-box implementations of AES have been published and analyzed in the literature. SM4 is a newer standardized cipher and has not been analyzed much in the white-box context. SM4 is a block cipher used in the Chinese National Standard for Wireless LAN WAPI. The SM4 algorithm was invented by Lu Shuwang and it became a national standard in China (GB/T 32907-2016) in August 2016. The SM4 cipher has a block size of 128 bits. It uses an 8-bit S-box and the key size is 128 bits. The only operations used are 32-bit bitwise XOR, 32-bit circular shifts and S-box applications. Encryption or decryption of one block of data is composed of 32 rounds. Each round updates a quarter (i.e., 32 bits) of the internal state. A non-linear key schedule is used to produce the round keys. Decryption uses the same round keys as for encryption, except that they are in reversed order. The round structure of SM4 has several similarities with AES, including an 8-bit S-box determined by inversion in a finite field followed by linear diffusion between the output of four S-boxes.

The first white-box SM4 implementation was proposed by Xiao, Y.; Lai, X. *White-Box Cryptography and a White-Box Implementation of the SMS4 Algorithm*; Shanghai Jiaotong University: Shanghai, China, pp. 24-34, 2009. The cipher of Xiao et al. was proved to be unsecure from an attack similar to a BGE attack. Another white-box SM4 implementation was proposed in Shi, Y., Wei, W. and He, Z., *Lightweight White-box Symmetric Encryption Algorithm Against Node Capture for WSNs*, Sensors, 15(5), pp.11928-11952, 2015. This implementation uses the concept of dual ciphers and a randomly selected nonsingular matrix to construct a functionally equivalent white-box encryption algorithm of SM4. Lin, Tingting, et al. *Security Evaluation and Improvement of a White-Box SMS4 Implementation Based on Affine Equivalence Algorithm*, The Computer Journal 61.12: 1783-1790, 2018, presented an analysis of this implementation and described how an affine equivalence algorithm could be used to extract the key.

SUMMARY

The implementations described herein are white-box implementations that can be applied to SM4. Techniques are applied in a novel manner to create a practical implementation of fixed-key SM4 resistant to white-box attacks. The techniques include the use of a composite fields made possible by the S-box structure, re-expressing the entire cipher in terms of 4-bit intermediate variables to reduce total table size, exclusive use of lookup-tables, and the application of an (n,n) threshold scheme where shares are generated using other parts of the processing state in the generation of the shares. The white-box SM4 implementations described herein are resistant against known white-box attacks, such as affine equivalence attacks, BGE-like attacks and DCA-like attacks.

One implementation includes a method, apparatus or computer-readable media for implementing a white-box block cipher in a software application to create a secure software application having the same functionality as the software application, the method comprising creating an implementation of a block cipher by:

applying an isomorphism between an original finite field representation and a composite field representation, and using this isomorphism to reconstruct the cipher as operations that use only the elements of the composite field, including XOR, linear transformation and S-box; decomposing original S-box into several algebraic steps and merging some of these into other parts of the cipher; in the non-linear step of S-box, implementing the inversion in the original finite field representation with algorithm in the composite field representation; applying an initial threshold implementation of m input shares and n output shares to generate lookup tables for the non-linear step of S-box; applying further threshold implementations to different steps of the cipher to generate lookup tables; and applying the block cipher to at least a portion of the software application to create the secure software application and thereby increase security of a computing platform executing the secure software application.

BRIEF DESCRIPTION OF THE DRAWING

Implementations of the invention will be described below in connection with the attached drawing in which:

FIG. 6 is a block diagram of mask generation based on the lookup table of FIG. 5.

DETAILED DESCRIPTION

Figure 1:
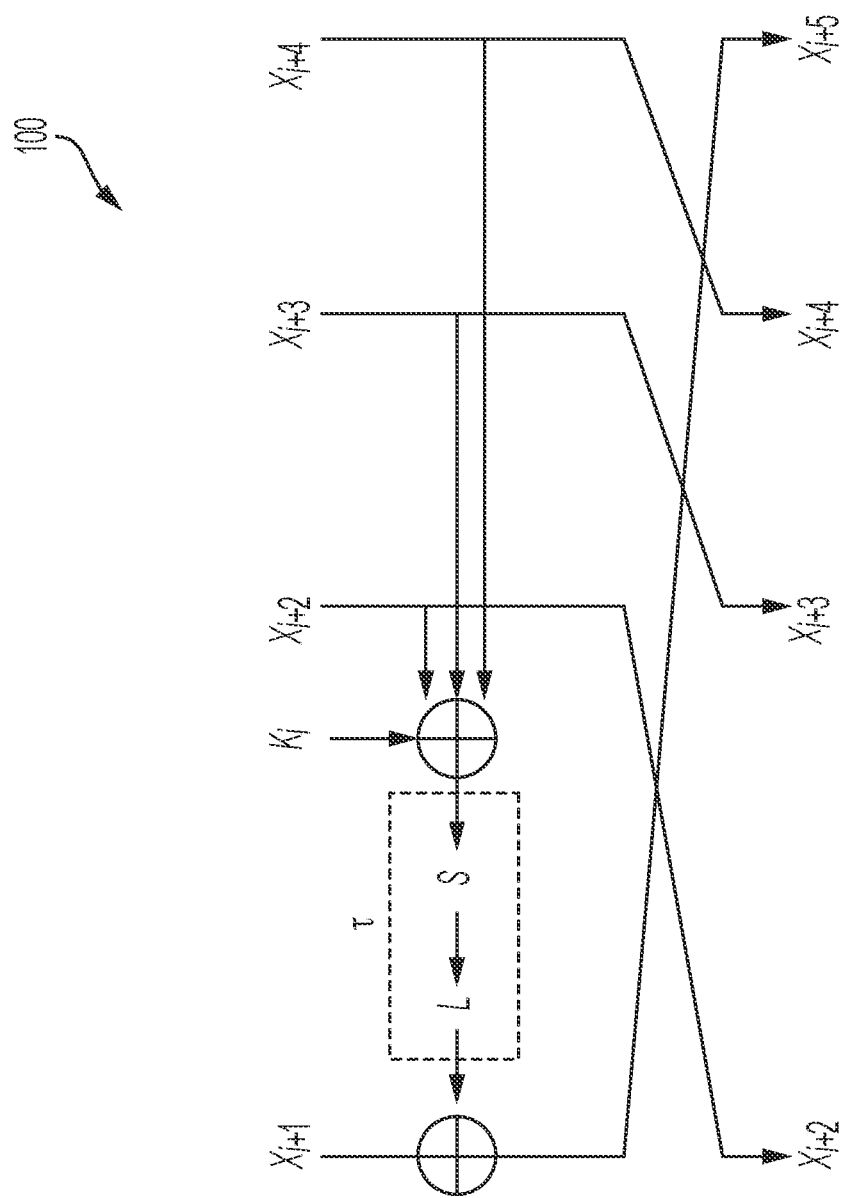
FIG. 1 is a block diagram on one round of an SM4 block cipher in accordance with a disclosed implementation.

Before describing the novel aspects of the disclosed implementations, SM4 will be described in greater detail. SM4 was selected to be used in the Wired Authentication and Privacy Infrastructure (WAPI) standard, is officially mandated in China and plays an important part in providing data confidentiality for WLAN products. SM4 has a 128-bit key size, a 128-bit block size and a 32-round unbalanced Feistel network structure. Let $\{X_0,X_1,X_2,X_3\}\in GF(2^{32})^4$ be the plaintext, $K_i\in GF(2^{32})^4$, (i=0, 1, 2, ..., 31) be the round keys. The SM4 encryption operation is then shown at 100 in FIG. 1. As shown, the plain text $\{X_0, X_1, X_2, X_3\}$ is inputted. Then, for i=0, 1, . . . , 31:

$$X_{i+4} = F(X_i, X_{i+1}, X_{i+2}, X_{i+3}, K_i)$$
$$= X_i \oplus \tau(X_{i+1} \oplus X_{i+2} \oplus X_{i+3} \oplus K_i)$$

The resulting output the cipher text is:

$$(Y_0, Y_1, Y_2, Y_3) = (X_{35}, X_{34}, X_{33}, X_{32})$$

Where:
The transformation $\tau: GF(2^{32}) \rightarrow GF(2^{32})$ is a reversible substitution. It is composed of a linear transformation L and a non-linear transformation S and, namely $\tau(x) = L(S(x))$.

The linear transformation L is defined as $L(B) = B \oplus (B<<<2) \oplus (B<<<10) \oplus (B<<<18) \oplus (B<<<24)$ for $B \in GF(2^{32})$.

The transformation S applies four 8×8 bijective S-Boxes in parallel: $S(A) = (Sbox(a_0), Sbox(a_1), Sbox(a_2), Sbox(a_3))$ for $A = (a_0, a_1, a_2, a_3)$, $S(A) \in GF(2^8)^4$.

The decryption procedure is identical to encryption procedure, except that the order in which the round keys are used is reversed.

Composite fields are often used in implementations of Galois Field arithmetic. A field $GF(2^k)$ is a composite field when k is not a prime and can be written as k=mn. The fields $GF(2^k)$ and $GF((2^m)^n)$ are isomorphic to each other. With an isomorphism, the elements and the operations can be mapped from one to the other.

For an implementation, the composite field $GF(2^8)$ is used. The elements are mapped in $GF(2^8)$ to $GF((2^4)^2)$, where the arithmetic in $GF((2^4)^2)$ is constructed by following field polynomials $P_1(x)$ and $P_2(x)$ both being irreducible:

$$P_1(x) = x^2 + tx + n, \text{ over } GF(2^4)$$

$$P_2(x) = x^4 + ux^3 + vx^2 + wx + N, \text{ over } GF(2).$$

A general element g of $GF((2^4)^2)$ can be represented as a linear polynomial (in Y) over, $GF(2^4)$, as $g = \gamma_1 Y \oplus \gamma_0$, with multiplication modulo polynomial $P_i(x)$. All the coefficients are in the 4-bit subfield $GF(2^4)$. So the pair $(\gamma_1, \gamma_0)$ represents g in terms of a polynomial basis [Y, 1], where Y is one root of $P_i(x)$.

The isomorphism mappings and the operation representations depend on the field polynomials and different bases. We are free to choose either type of basis at each level. The isomorphism mappings between $GF(2^8)$ and $GF((2^4)^2)$ can be found in a known manner, such as is taught by Rudra, A., Dubey, P. K., Jutla, C. S., Kumar, V., Rao, J. R. and Rohatgi, P. *Efficient Rijndael Encryption Implementation with Composite Field Arithmetic*, International Work-shop on Cryptographic Hardware and Embedded Systems pp.171-184. Springer, Berlin, Heidelberg, May, 2001; Paar, C. *Efficient VLSI Architectures for Bit-parallel Computation in Galois fields*. PhD Thesis, Inst. for Experi-mental Math., Univ. of Essen, 1994; and Wong, M. M., Wong, M. L. D., Hijzin, I. and Nandi, A. K. *Composite field GF (((2 2)2)2) AES S-Box with Direct Computation in GF (2 4) Inversion*, Information Technology in Asia (CITA 11), 2011 7th International Conference on, pp. 1-6. IEEE. The details of a known method for representing the operations, such as multiplication and multiplicative inverse, can be found in Canright, D., 2005, August, *A Very Compact S-box for AES*, International Workshop on Cryptographic Hardware and Embedded Systems pp. 441-455, Springer, Berlin, Heidelberg, July, 2011.

Threshold Implementations are well known as a side channel attack countermeasure as taught by Nikova, S., Rechberger, C. and Rijmen, V. December, *Threshold implementations Against Side-channel Attacks and Glitches*, International conference on information and communications security pp. 529-545, Springer, Ber-lin, Heidelberg. December 2006. Such an attack is based on secret sharing and multiparty computation. In a disclosed implementation an (n,n) threshold system, which requires a set of n functions $f_i$ to compute the outputs of a function f, is used. The set of n outputs of the functions $f_i$ are called the output shares.

Let $z = f(A, B, \ldots)$ denote a function. A variable A is split into n shares $A_i$ when $A = \Sigma_i A_i$. A secure threshold implementation can satisfy three properties:

Property 1 (Non-completeness). Every function is independent of at least one share of each of the input variables A, B, . . .

$$z_1 = f_1(A_2, A_3, \ldots, A_n, B_2, B_3, \ldots, B_n, \ldots)$$
$$z_2 = f_2(A_1, A_3, \ldots, A_n, B_1, B_3, \ldots, B_n, \ldots)$$
$$\ldots\ldots$$
$$z_n = f_n(A_1, A_2, \ldots, A_{n-1}, \ldots, B_1, B_2, \ldots, B_{n-1}, \ldots)$$

Property 2 (Correctness). The sum of the sharing gives the desired output.

$z = \Sigma_i z_i = \Sigma_i f_i$.

Property 3 (Uniformity). If the input shares $(A_1, A_2, L, A_n)$ consistent with A are uniformly distributed, and similarly for B, C, . . . , the output shares consistent with z must be uniformly distributed.

The number of the input shares and output shares affects the properties of a threshold implementation. For example, the uniformity is not guaranteed if a threshold implementation is applied with three shares for each input X, Y and Z, and three output shares to the function $F(X,Y,Z) = X + YZ$. The details of how to create a threshold implementation for such functions are well-known and not discussed further herein. For example, more details and constructions can be found in Bilgin B, Nikova S, Nikov V, Rijmen V, Stütz G, *Threshold implementations of all 3×3 and 4×4 S-Boxes*, International Workshop on Cryptographic Hardware and Embedded Systems, 9, pp. 76-91), Springer, Berlin, Heidelberg, September 2012;]Nikova, S., Rechberger, C. and Rijmen, V. December, *Threshold Implementations Against Side-channel Attacks and Glitches*, International conference on information and communications security pp. 529-545, Springer, Berlin, Heidelberg. December 2006; Nikova, S., Rijmen, V. and Schlaffer, M. *Secure Hardware Implementation of Non-linear Functions in the Presence of Glitches*, International Conference on Information Security and Cryptology p.p 218-234), Springer, Berlin, Heidelberg, December 2008. The disclosed implementations use TI to indicate a threshold implementation.

Before describing the disclosed implementations in detail, several techniques are discussed below. Chow, S., Eisen, P., Johnson, H. and Van Oorschot, P. C., *White-box cryptography and an AES implementation*, International Workshop on Selected Areas in Cryptography, pp. 250-270. Springer, Berlin, Heidelberg. August 2002, teaches that the algebraic structure of an S-box can be represented as:

$$S(x) = A_2 \cdot (A_1 \cdot x \oplus C_1)^{-1} \oplus C_2.$$

with $$A_1 = \begin{bmatrix} 1 & 0 & 1 & 0 & 0 & 1 & 1 & 1 \\ 0 & 1 & 0 & 0 & 1 & 1 & 1 & 1 \\ 1 & 0 & 0 & 1 & 1 & 1 & 1 & 0 \\ 0 & 0 & 1 & 1 & 1 & 1 & 0 & 1 \\ 0 & 1 & 1 & 1 & 1 & 0 & 1 & 0 \\ 1 & 1 & 1 & 1 & 0 & 1 & 0 & 0 \\ 1 & 1 & 1 & 0 & 1 & 0 & 0 & 1 \\ 1 & 1 & 0 & 1 & 0 & 0 & 1 & 1 \end{bmatrix}, C_1 = \begin{bmatrix} 1 \\ 1 \\ 0 \\ 0 \\ 1 \\ 0 \\ 1 \\ 1 \end{bmatrix}$$

$$A_2 = \begin{bmatrix} 1 & 1 & 0 & 0 & 1 & 0 & 1 & 1 \\ 1 & 0 & 0 & 1 & 0 & 1 & 1 & 1 \\ 0 & 0 & 1 & 0 & 1 & 1 & 1 & 1 \\ 0 & 1 & 0 & 1 & 1 & 1 & 1 & 0 \\ 1 & 0 & 1 & 1 & 1 & 1 & 0 & 0 \\ 0 & 1 & 1 & 1 & 1 & 0 & 0 & 1 \\ 1 & 1 & 1 & 0 & 0 & 1 & 0 & 0 \\ 1 & 1 & 0 & 0 & 1 & 0 & 0 & 1 \end{bmatrix}, C_2 = \begin{bmatrix} 1 \\ 1 \\ 0 \\ 1 \\ 0 \\ 0 \\ 1 \\ 1 \end{bmatrix};$$

and the underlying irreducible polynomial for GF ($2^8$) over GF (2) is: $f(x)=x^8+x^7+x^6+x^5+x^4+x^3+x^2+1$.

However, applicant has discovered that this does not match with the S-box table of SM4. Therefore, the matrix $A_2$ and the irreducible polynomial have been modified in a novel manner. Verification shows that following parameters and irreducible polynomial will correctly generate the lookup table for the SM4 S-box:

$$A_1 = \begin{bmatrix} 1 & 0 & 1 & 0 & 0 & 1 & 1 & 1 \\ 0 & 1 & 0 & 0 & 1 & 1 & 1 & 1 \\ 1 & 0 & 0 & 1 & 1 & 1 & 1 & 0 \\ 0 & 0 & 1 & 1 & 1 & 1 & 0 & 1 \\ 0 & 1 & 1 & 1 & 1 & 0 & 1 & 0 \\ 1 & 1 & 1 & 1 & 0 & 1 & 0 & 0 \\ 1 & 1 & 1 & 0 & 1 & 0 & 0 & 1 \\ 1 & 1 & 0 & 1 & 0 & 0 & 1 & 1 \end{bmatrix}, C_1 = \begin{bmatrix} 1 \\ 1 \\ 0 \\ 0 \\ 1 \\ 0 \\ 1 \\ 1 \end{bmatrix}$$

$$A_2 = \begin{bmatrix} 0 & 1 & 0 & 0 & 1 & 0 & 1 & 1 \\ 1 & 0 & 1 & 1 & 1 & 1 & 0 & 1 \\ 0 & 1 & 0 & 1 & 0 & 0 & 0 & 1 \\ 1 & 0 & 0 & 0 & 1 & 0 & 0 & 1 \\ 0 & 0 & 1 & 1 & 1 & 0 & 0 & 1 \\ 0 & 1 & 0 & 1 & 1 & 0 & 0 & 1 \\ 1 & 0 & 0 & 1 & 0 & 0 & 0 & 0 \\ 0 & 1 & 1 & 0 & 0 & 0 & 0 & 0 \end{bmatrix}, C_2 = \begin{bmatrix} 1 \\ 1 \\ 0 \\ 1 \\ 0 \\ 0 \\ 1 \\ 1 \end{bmatrix};$$

and the underlying irreducible polynomial for GF($2^8$) over GF(2) is:

$$f(x)=x^8+x^6+x^4+x^3+x^2+x+1.$$

It may be noted that the polynomial is simply the reciprocal polynomial (reversed coefficients), and $C_1$, $A_2$ and $C_2$ are the same, but the matrix $A_2$ is substantially different.

In each round, four 8-bit S-Boxes are applied in parallel and the linear transformation L can be expressed as a block matrix composed of 8×8 matrices. This allows the entire SM4 operation to be expressed in terms of byte-wide operations. The 32×32 linear transformation L is expressed as a 4×4 block matrix of 8×8 matrices:

$$L = \begin{bmatrix} l_{00} & l_{01} & l_{02} & l_{03} \\ l_{10} & l_{11} & l_{12} & l_{13} \\ l_{20} & l_{21} & l_{22} & l_{23} \\ l_{30} & l_{31} & l_{32} & l_{33} \end{bmatrix}$$

Thirty-two-bit inputs/outputs and round key in each round are presented as the concatenation of four bytes each:

$$X_t = x_{t0} \| x_{t1} \| x_{t2} \| x_{t3} (t=\{0, 1, \ldots, 35\})$$

$$K_r = k_{r0} \| k_{r1} \| k_{r2} \| k_{r3} (r=\{0, 1, \ldots, 31\})$$

The round key can be embedded in the S-boxes: $S_{k_{rj}}(x)=S(x \oplus k_{rj})$. One byte of the output in each round can be calculated as follows:

$$x_{(r+4)j} = x_{rj} \oplus l_{j0} \cdot S_{k_{r0}}(x_{(r+1)0} \oplus x_{(r+2)0} \oplus x_{(r+3)0}) \oplus$$
$$l_{j1} \cdot S_{k_{r1}}(x_{(r+1)1} \oplus x_{(r+2)1} \oplus x_{(r+3)1}) \oplus$$
$$l_{j2} \cdot S_{k_{r2}}(x_{(r+1)2} \oplus x_{(r+2)2} \oplus x_{(r+3)2}) \oplus l_{j3} \cdot S_{k_{r3}}(x_{(r+1)3} \oplus x_{(r+2)3} \oplus x_{(r+3)3})$$

Where r=0, 1, 2, . . . , 31; j=0, 1, 2, 3.

Figure 2:
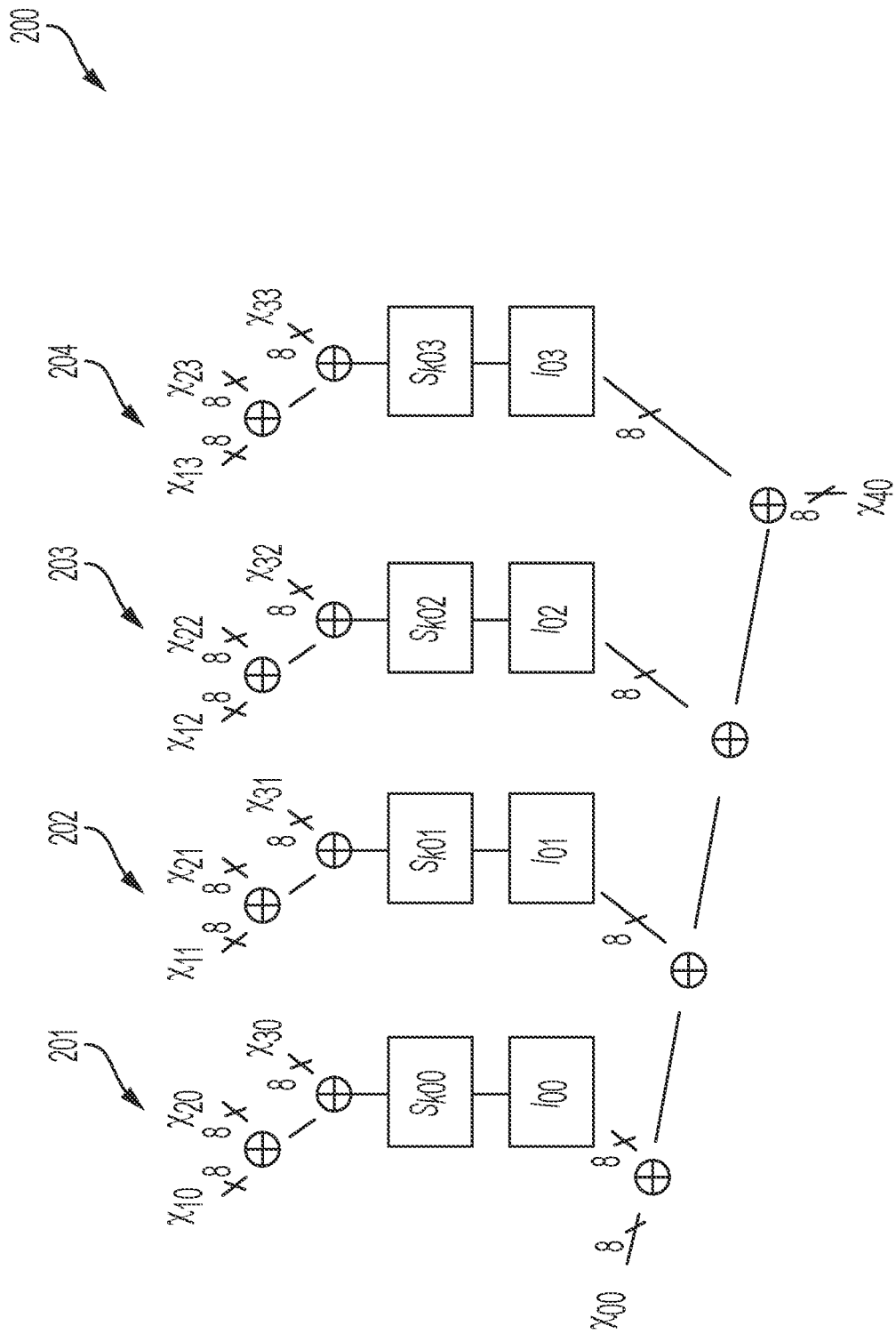
FIG. 2 is a block diagram of a byte-wise operation example in SM4 in accordance with a disclosed implementation.

For example, if the key byte is fixed in the S-box, the first byte of x, can be calculated with process shown at 200 in FIG. 2. The parallel four byte-wise operation sequences (respectively 201, 202, 203, and 204) before the final XOR in FIG. 2 are referred to as four "branches" herein.

Multiplications in GF($2^4$) can be defined with an irreducible polynomial of degree 4 over GF(2). Only three irreducible polynomials with degree 4 exist, of which any one can be used for the definition:

$$f_1(x)=x^4+x^3+x^2+x+1,$$

$$f_2(x)=x^4+x^3+1,$$

$$f_3(x)=x^4+x+1.$$

The field multiplication "*" is defined as:

$$A*B = (a_3, a_2, a_1, a_0)*(b_3, b_2, b_1, b_0)$$
$$= (a_3 x^3 + a_2 x^2 + a_1 x + a_0)(b_3 x^3 + b_2 x^2 + b_1 x + b_0) \bmod(f_i(x))$$

The number of input shares and output shares for a threshold implementation may differ. When a threshold implementation of m input shares and n output shares is applied on a function F(X,Y,Z, . . . ) (denoted as H[F(X, Y,Z, . . . )]), the following steps generate a lookup table:

1. Split each possible value of an input x into m shares randomly when generating the table. The set of shares of input x is $\{X_1, X_2, \ldots \}$, where m−1 of them are random values (for example $\{X_1, X_2, \ldots, X_{m-1}\}$) generated from a pseudo-random number generator (PRNG), and the last share is computed by $X_m = X \oplus X_1 \oplus X_2 \oplus L \oplus X_{m-1}$. The same as for Y, Z etc. Note that the input shares are used only in the table generation, but the inputs of the lookup table are X,Y,ZK.

2. Given the functions $F_i$, compute n output shares with:

$$z_1 = F_1(X_2, X_3, \ldots, X_m, Y_2, Y_3, \ldots, Y_m, \ldots)$$

$$z_2 = F_2(X_1, X_3, \ldots, X_m, Y_1, Y_3, \ldots, Y_m, \ldots)$$

$$\ldots\ldots$$

$$z_n = F_n(X_1, X_2, \ldots, X_{m-1}, \ldots, Y_1, Y_2, \ldots, Y_{m-1}, \ldots)$$

As described above, it is assumed that such threshold implementations exist, and TI is used to indicate that a threshold implementation is applied.

Figure 3:
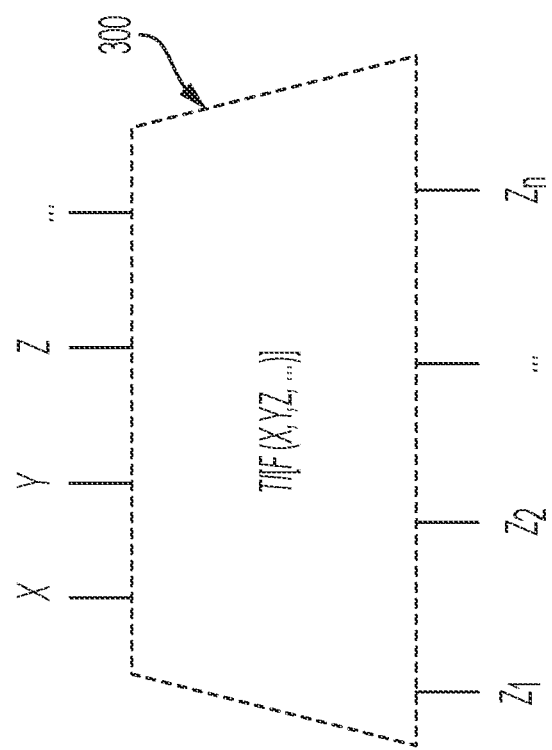
FIG. 3 is a block diagram of a lookup table generated by a threshold implementation in accordance with a disclosed implementation.

Steps 1 and 2 can be repeated for all the possible inputs X,Y,Z, . . . , to obtain corresponding output shares. The lookup table, shown in FIG. 3, is generated based on the inputs and its corresponding output shares. A dotted box is used to denote a lookup table herein.

To provide resistance to existing white-box attacks, such as affine equivalence attacks, BGE attacks, and DCA-like attacks, the disclosed implementations can be created based on the following rules:
1. The way of applying masks (at least on the S-box) should not be affine.
2. The masks can be data-dependent.
3. The structure of the algorithm should be as obscure as possible.
4. The correlations between the outputs of each step in the white-box SM4 implementation and in the standard SM4 cannot be used to apply analysis.
5. Each mask can be dependent on an earlier mask in an inverted tree structure.

In the disclosed implementation, each intermediate variable is split into four-bit nibbles. With the operations in SM4, such as XOR, shift, and S-box, being divided into several steps, the 4-bit data as well as masks will be processed, and corresponding lookup tables will be generated. The threshold implementations are used to extend the output space of some lookup tables and produce masks at the same time. An isomorphic map is applied on the 4-bit data in S-box to obscure the inner operation. The whole encryption consists of only lookup tables, other calculations are not required.

Figure 4:
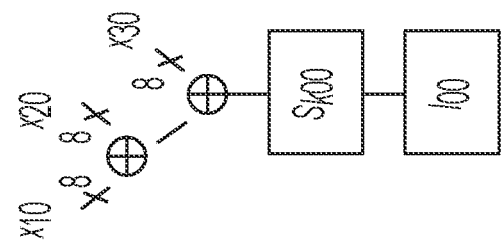
FIG. 4 is a block diagram of the processing of one branch of first round in accordance with a disclosed implementation.
Figure 5:
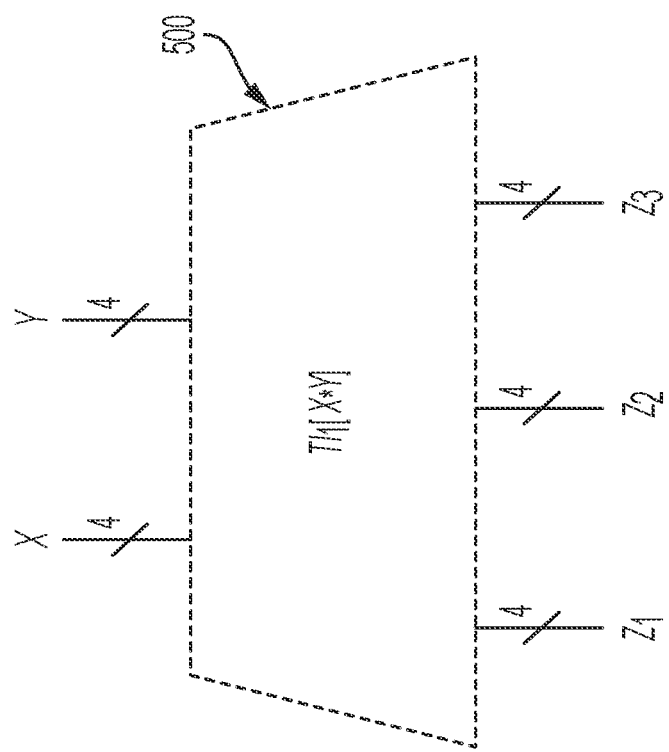
FIG. 5 is a block diagram of a lookup table for mask generation in accordance with a disclosed implementation.

In the first round, an example of implementing the first branch of FIG. 2 is described. Other branches can be implemented in a similar manner. As shown in FIG. 4, a threshold implementation $TI_1$ of 4 shares of each input and 3 output shares is selected and applied to the function $F(X,Y)=X*Y$ to generate the lookup table 500 shown in FIG. 5. Each input is divided into two four-bit nibbles: $x_1=x_{10}^0\|x_{10}^1, x_2=x_{20}^0\|x_{20}^1, x_{30}=x_{30}^0\|x_{30}^1$. Using the lookup table, masks $f_{r,j}^{(i)}$ are generated from $x_{10}^0$ and $x_{20}^0$, and masks $g_{r,j}^{(i)}$ from $x_{10}^1$ and $x_{20}^1$, where r=0,1, K,31, i=0,1,2,3, j=0,1,2. The data flow is depicted at 600 in FIG. 6, using the same table in both cases.

Figure 7:
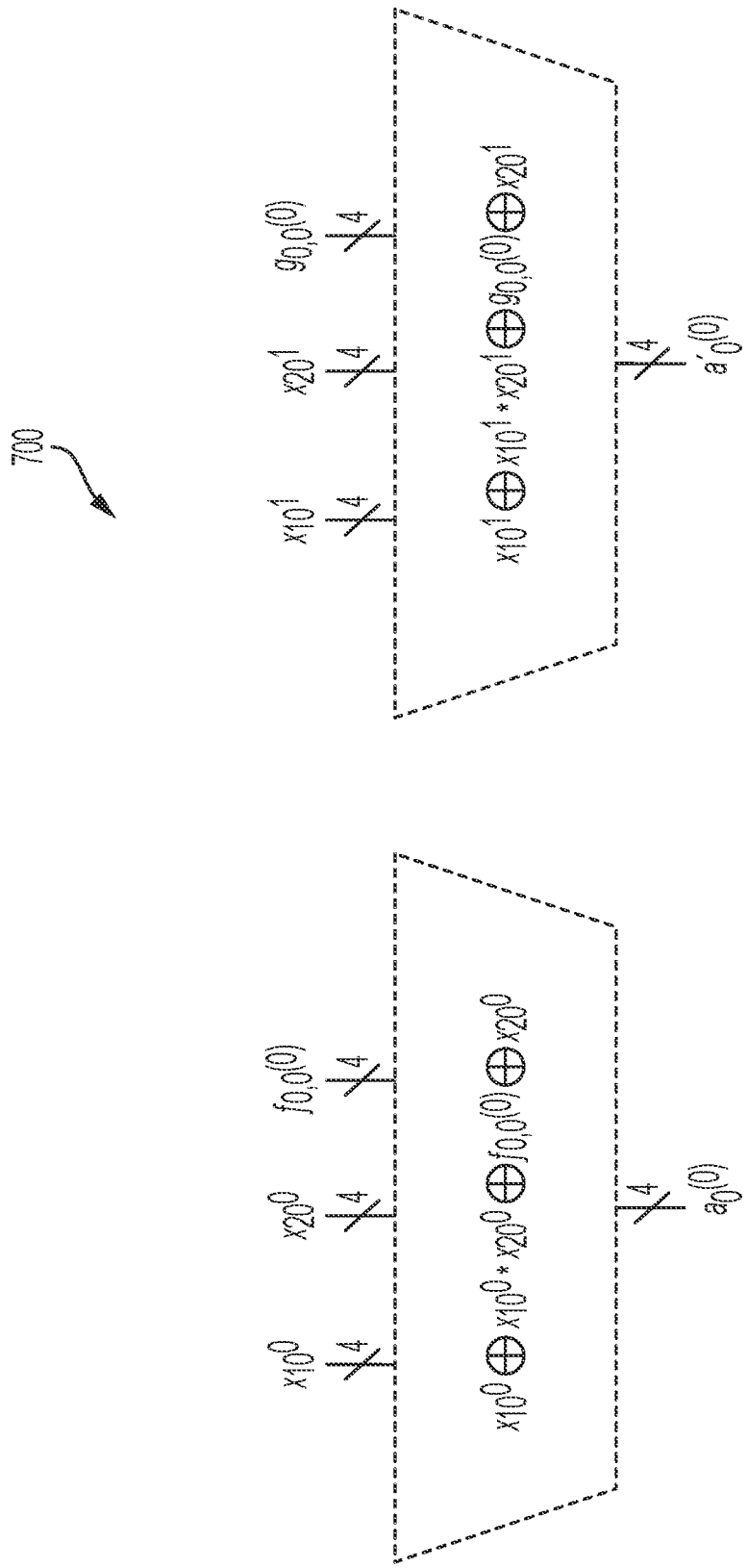
FIG. 7 is a block diagram of a computation step in accordance with a disclosed implementation.

To compute $x_{10}^0 \oplus x_{20}^0 \oplus x_{30}^0$ and $x_{10}^1 \oplus x_{20}^1 \oplus x_{30}^1$, the additions are accomplished with several steps. In each step, some masks are canceled out and new masks are added. First, the function $F(X,Y,Z)=X \oplus X*Y \oplus Y \oplus Z$ is used to generate a lookup table. Using the lookup table, we get $a_r^{(i)}$ and $a'_r^{(i)}$, where r and i are the same as before. This data flow is depicted at 700 in FIG. 7, where the same table is used twice. Note the table generation is not specific to the variables, but the data flow is shown with the specific variables used in this example.

Figure 8:
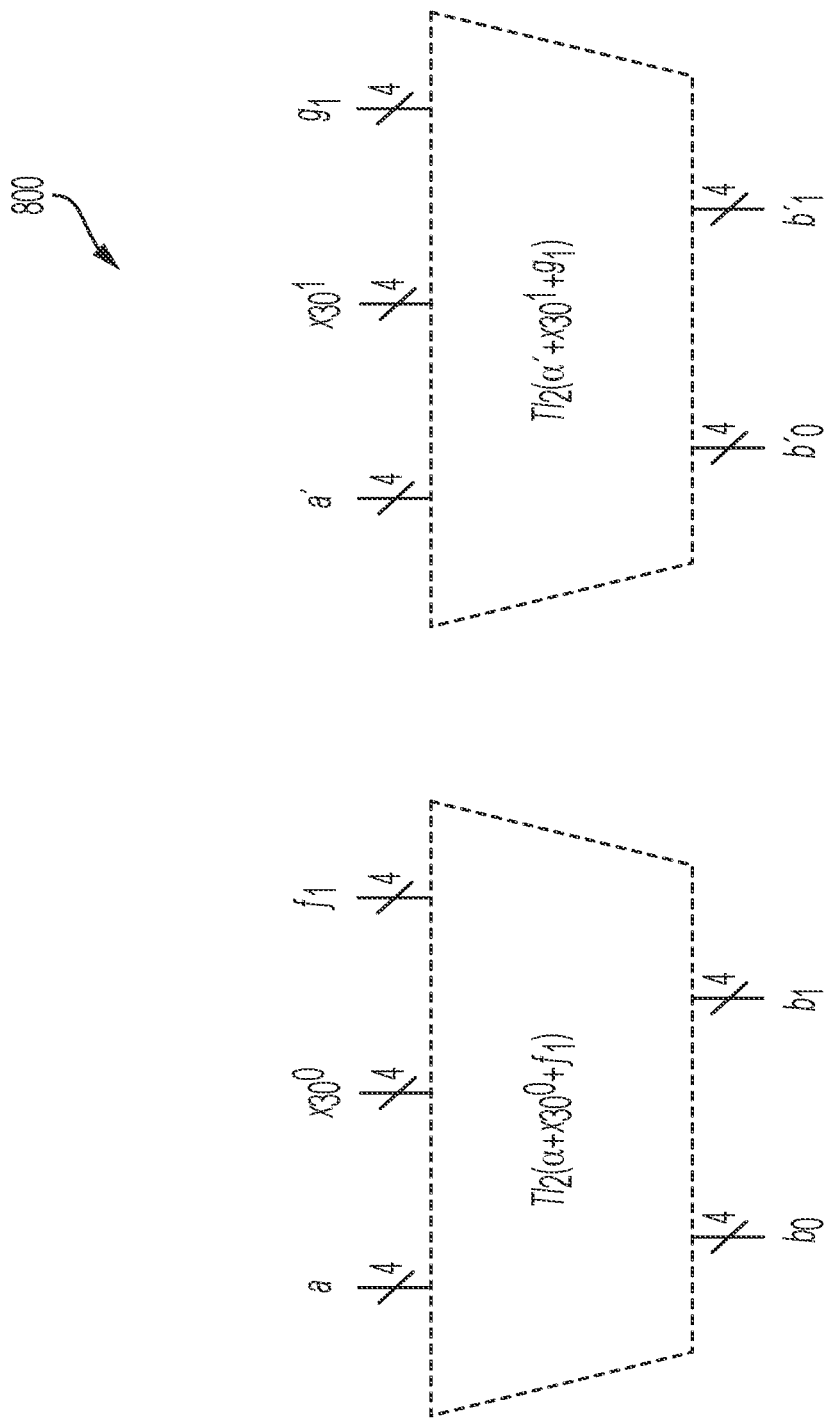
FIG. 8 is a block diagram of a computation step in accordance with a disclosed implementation.
Figure 9:
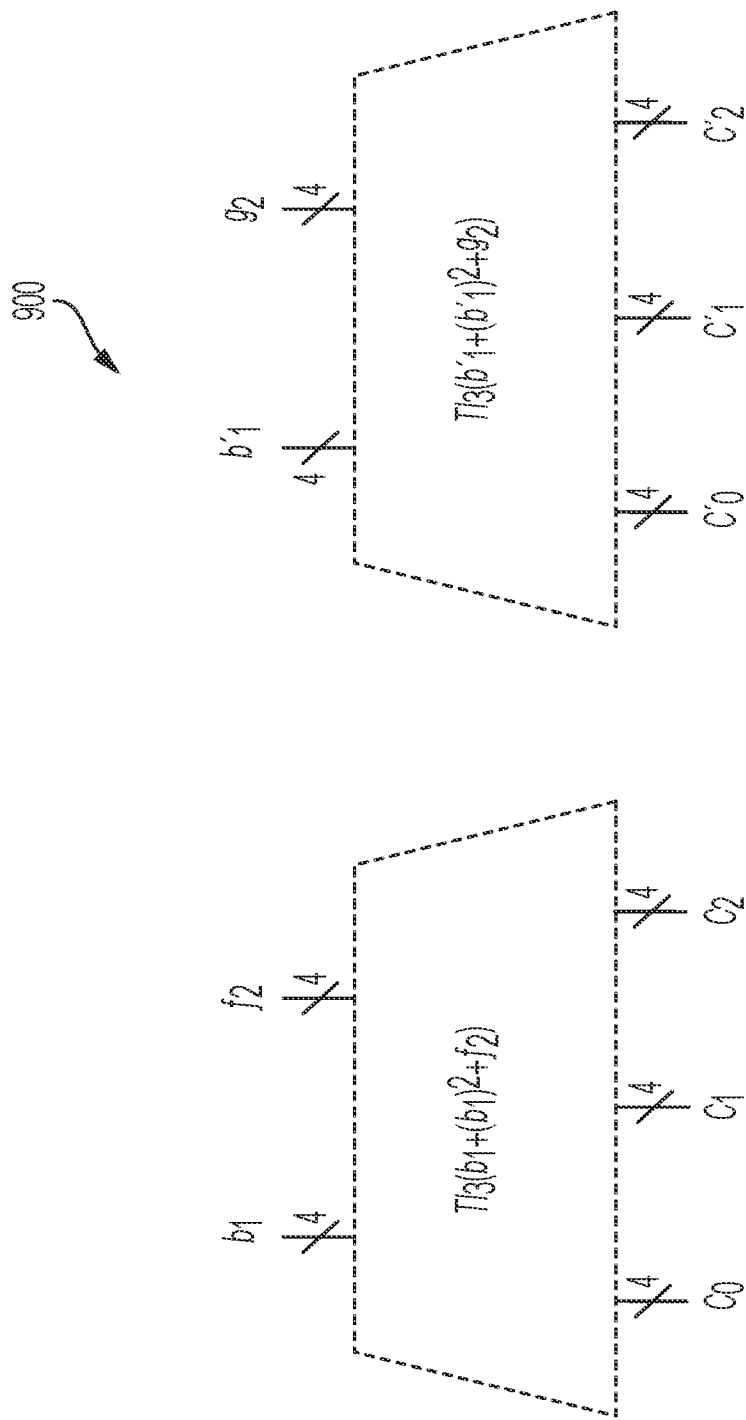
FIG. 9 is a block diagram of a computation step in accordance with a disclosed implementation.

A threshold implementation of 2 shares of each input and 2 output shares ($TI_2$) is then selected and applied to the function $F(X,Y,Z)=X \oplus Y \oplus Z$ to generate a lookup table for $TI_2(X \oplus Y \oplus Z)$. Using the lookup table, we get $b_{r,j}^{(i)}$ from $(a_0^{(0)}, x_{30}^0, f_{0,1}^{(0)})$, and $b'_{r,j}^{(r)}$ from $(a'_0^{(0)}, x_{30}^1, g_{0,1}^{(0)})$, where r and i are the same as before, j=0,1. This data flow is shown at 800 in FIG. 8. Next, a threshold implementation of 4 shares of each input and 3 output shares ($TI_3$) is selected and applied to the function $F(X,Y)=X \oplus X^2 \oplus Y$ to generate a lookup table for $TI_3(X \oplus X^2 \oplus Y)$. Using the lookup table, we get $c_{r,j}^{(i)}$ from $(b_{0,1}^{(0)}, f_{0,2}^{(0)})$, and $c'_{r,j}^{(i)}$ from $(b'_{0,1}^{(0)}, g_{0,2}^{(0)})$, where r and i are the same as before, j=0,1,2. This data flow is shown at 900 in FIG. 9. As a result, we get $b_{0,0}^{(0)} \oplus c_{0,0}^{(0)} \oplus c_{0,1}^{(0)} \oplus c_{0,2}^{(0)} = x_{10}^0 \oplus x_{20}^0 \oplus x_{30}^0 \oplus (b_{0,1}^{(0)})^2$ from left-hand data flow, and $b'_{0,0}^{(0)} \oplus c'_{0,0}^{(0)} \oplus c'_{0,1}^{(0)} \oplus c'_{0,2}^{(0)} = x_{10}^1 \oplus x_{20}^1 \oplus x_{30}^1 \oplus (b_{0,1}^{(0)})^2$ right-hand data flow.

As noted above, the algebraic structure of a fixed-key S-box can be represented as:

$$S_{k_{rj}}(x) = S(x \oplus k_{rj}) = A_2(A_1 x \oplus A_1 k_{rj} \oplus c_1)^{-1} \oplus C_2.$$

We compute "$y = A_1 x$" first.
Let $$A_1 = \begin{bmatrix} 1 & 0 & 1 & 0 & 0 & 1 & 1 & 1 \\ 0 & 1 & 0 & 0 & 1 & 1 & 1 & 1 \\ 1 & 0 & 0 & 1 & 1 & 1 & 1 & 0 \\ 0 & 0 & 1 & 1 & 1 & 1 & 0 & 1 \\ 0 & 1 & 1 & 1 & 1 & 0 & 1 & 0 \\ 1 & 1 & 1 & 1 & 0 & 1 & 0 & 0 \\ 1 & 1 & 1 & 0 & 1 & 0 & 0 & 1 \\ 1 & 1 & 0 & 1 & 0 & 0 & 1 & 1 \end{bmatrix} = \begin{bmatrix} A_{00} & A_{01} \\ A_{10} & A_{11} \end{bmatrix}$$

$$x = \begin{bmatrix} x_0 \\ x_1 \end{bmatrix}$$

where $A_{ij}$ is a 4×4 block matrix of $A_1$, $x_i$ is a 4×1 vector. The multiplication "$A_1 x$" can be represented as:

$$A_1 x = \begin{bmatrix} A_{00} & A_{01} \\ A_{10} & A_{11} \end{bmatrix} \begin{bmatrix} x_0 \\ x_1 \end{bmatrix} = \begin{bmatrix} Z_{00} x_0 \oplus A_{01} x_1 \\ A_{10} x_0 \oplus A_{11} x_1 \end{bmatrix}$$

Six lookup tables for can be generated for functions:

$$F_0(X,Y,Z) = A_{00} X \oplus A_{01} Y \oplus A_{00} Z,$$

$$F_1(X,Y,Z) = i\, X \oplus A_{01} Y \neq A_{00} Z,$$

$$F_2(X,Y,Z) = X \oplus A_{01} Y \oplus A_{00} Z^2,$$

$$G_0(X,Y,Z) = A_{11} X \oplus A_{10} Y \oplus A_{10} Z,$$

$$G_1(X,Y,Z) = X \oplus A_{11} Y \oplus A_{10} Z,$$

$$G_2(X,Y,Z) = X \oplus A_{11} Y \oplus A_{10} Z^2$$

Figure 10:
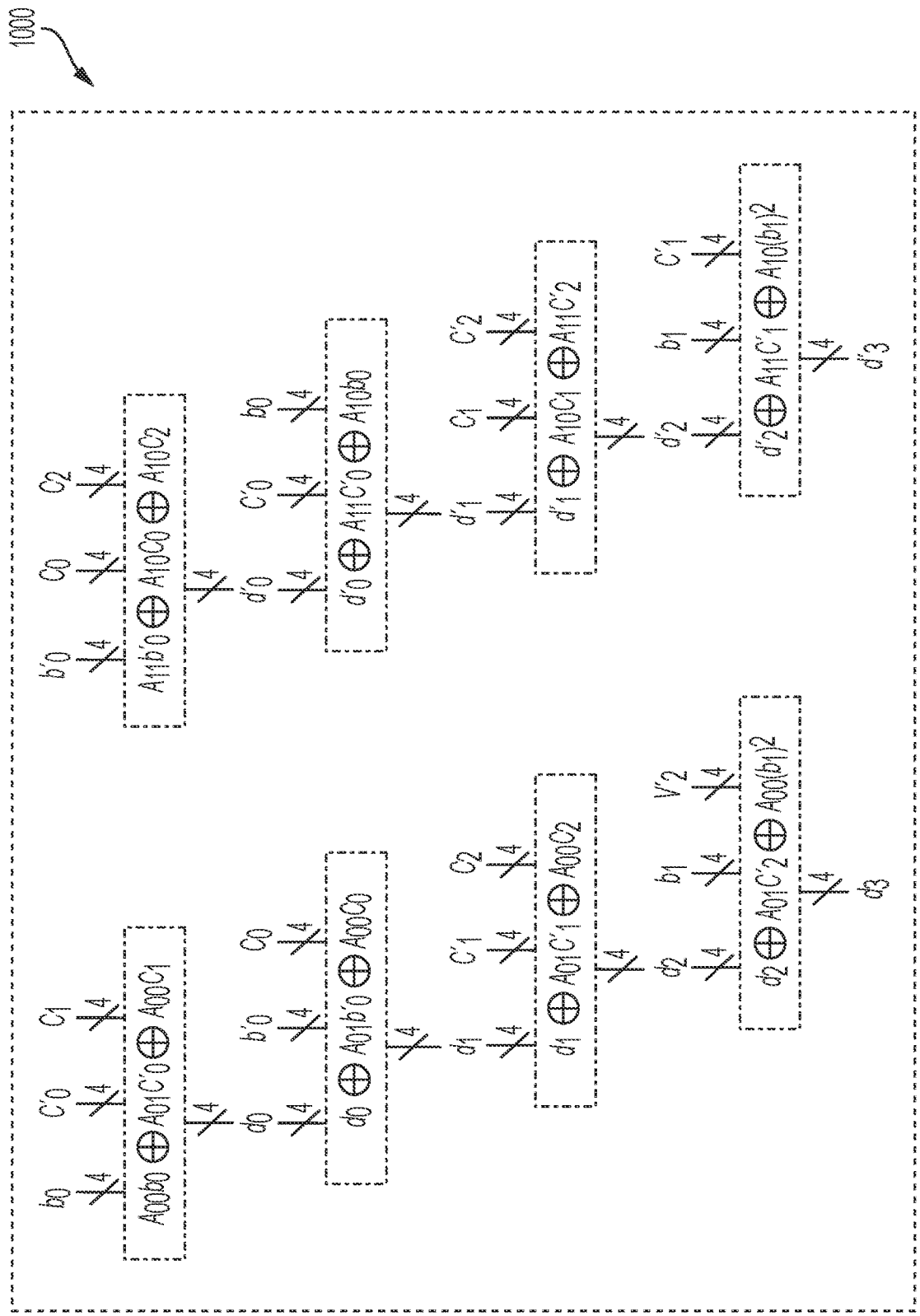
FIG. 10 is a block diagram of a computation step in accordance a the disclosed implementation.

The data flow 1000 of FIG. 10 shows this computation. From the left-hand data flow we get:

$$d_{0,3}^{(0)} = A_{00}(x_{10}^0 \oplus x_{20}^0 \oplus x_{30}^0) \oplus A_{01} \oplus (x_{10}^1 \oplus x_{20}^1 \oplus x_{30}^1) \oplus A_{01}(b_{0,1}^{(0)})^2 \text{ and}$$

$$d'_{0,3}^{(0)} = A_{10}(x_{10}^0 \oplus x_{20}^0 \oplus x_{10}^0) \oplus A_{11} \oplus (x_{10}^1 \oplus x_{20}^1 \oplus x_{30}^1) \oplus A_{11}(b_{0,1}^{(0)})^2,$$

The remaining portions of the standard S-box can be computed as:

$$T_{k_{rj}}(y)=A_2(y\oplus A_1 k_{rj}\oplus C_1)^{-1}\oplus C_2.$$

Figure 11:
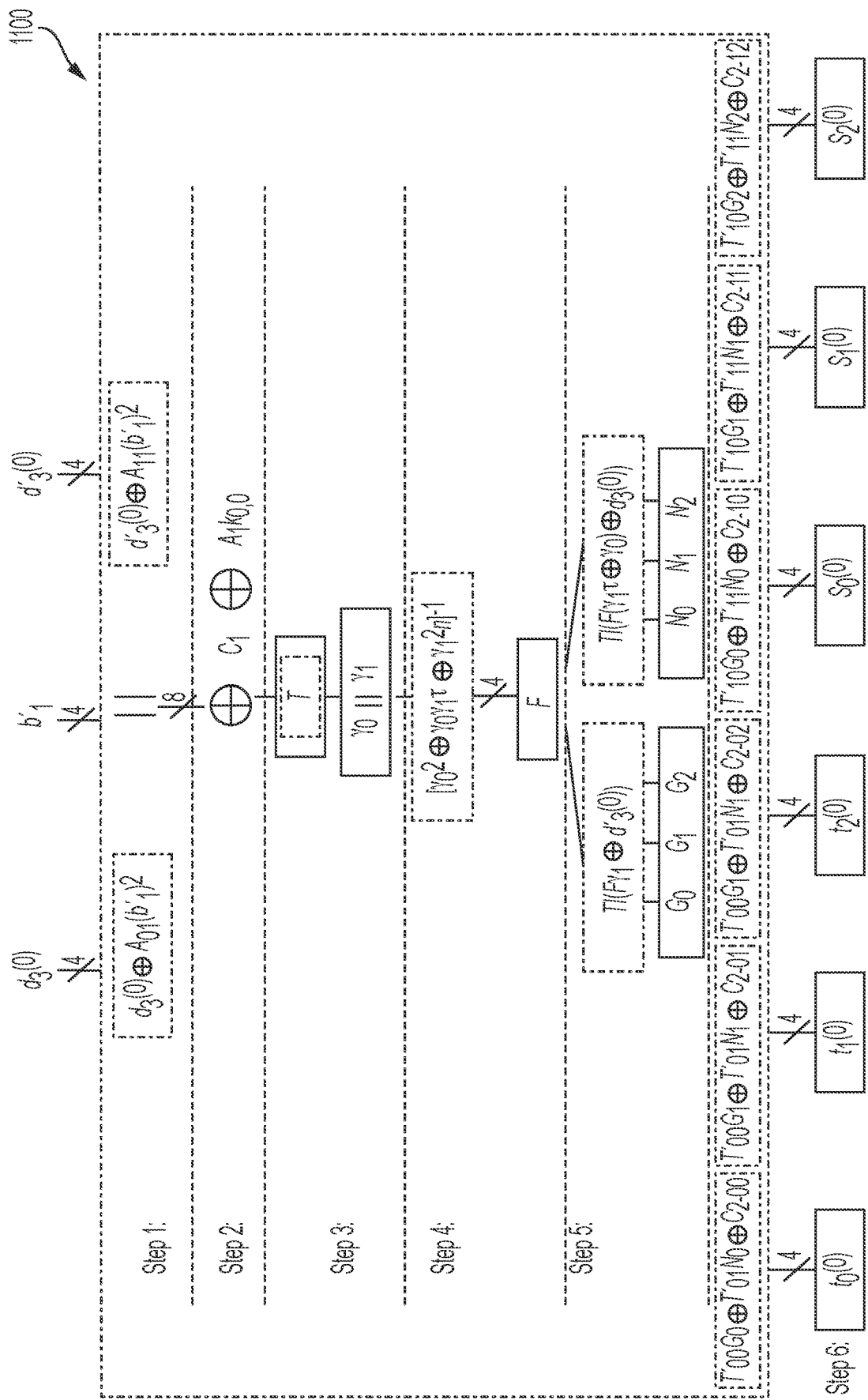
FIG. 11 is a block diagram of a process for creating a T-box in accordance a the disclosed implementation.

Now a T-box can be created using the data flow 1100 shown in FIG. 11. The masked data $d_{0,3}{}^{(0)}$ and $d'_{0,3}{}^{(0)}$ are the inputs of the T-box. To obfuscate the relationship between the inputs and outputs of the T-Box, the lookup table is created with a threshold implementation. However, it is not practical to construct uniform threshold shares for an inverse function with 8-bit input, so an isomorphism is used to map the 8-bit operations into 4-bit operations of a chosen composite field. When the inversion is complete, $T^{-1}$ will be used to map the values back to the field GF ($2^8$). The lookup table T-box is generated for all the possible inputs and corresponding outputs with following steps. In Step 1 of FIG. 11, masks from $d_{0,3}{}^{(0)}$ and $d'_{0,3}{}^{(0)}$ are cancelled out by computing $d_{0,3}{}^{(0)}\oplus A_{01}(b'_{0,1}{}^{(0)})^2$ and $d'_{0,3}{}^{(0)}\oplus A_{11}(b'_{0,1}{}^{(0)})^2$. We get a y for $T_{k_{rj}}(y)$. In Step 2 of FIG. 11, $z=y\oplus A_1 k_{00}\oplus C_1$ is computed. In Step 3 of FIG. 11, $z^{-1}$ is computed in a composite field $GF((2^4)^2)$. Isomorphism mapping T is then used to transform the standard 8-bit value into two 4-bit values $\gamma_0\|\gamma_1$ in a composite field. Applicant has implemented a program to find T and the experiment shows that there are 120 irreducible polynomial P(x) of degree 2, and 128 mappings from $(GF(2^8),f(x))$ to $(GF((2^4)^2),P(x))$ for each P(x). Therefore, there are 15360 candidates for T. Each T is an 8×8 invertible matrix. One is chosen and in Step 4 of FIG. 11, $F=(\gamma_1^2 n+\gamma_1\lambda_0\tau+\gamma_0^2)^{-1}$ is computed. In Step 5 of FIG. 11, $F\gamma_1$ and $F(\gamma_1\tau+\gamma_0)$ are computed as the inverse of $\gamma_0\|\gamma_1$. Since a polynomial basis (Y,1) and $P(x)=x^2+\tau x+n$ was chosen, the inverse of $\gamma_0\|\gamma_1$ is given by:

$$(\gamma_1 Y+\gamma_0)^{-1}=[F\gamma_1]Y+[F(\gamma_1\tau+\gamma_0)],$$

where Y is one root of P(x). We apply threshold implementation (TI$_4$) of 4 shares of each input and 3 output shares to function $F\gamma_1+d'_3$ and $F(\gamma_1\tau+\gamma_0)+d_3$, their outputs shares are $(G_0,G_1,G_2)$ and $(N_0,N_1,N_2)$, respectively. In Step 6 of FIG. 11, let $$T'=A_2 T^{-1}=\begin{bmatrix} T'_{00} & T'_{01} \\ T'_{10} & T'_{11} \end{bmatrix}, C_2=\begin{bmatrix} C_{2-00}\oplus C_{2-01}\oplus C_{2-02} \\ C_{2-10}\oplus C_{2-11}\oplus C_{2-12} \end{bmatrix}$$

where $T'_{ij}$ is the 4×4 block matrix of T', $(C_{2-00},C_{2-01},C_{2-02})$ are three shares of the first 4-bit nibble of $C_2$, $(C_{2-10},C_{2-11},C_{2-12})$ are three shares of the last 4-bit nibble of $C_2$. Compute $t_i{}^{(0)}=T'_{00}G_i\oplus T'_{01}N_0\oplus C_{2-0i}$ and $s_i{}^{(0)}=T'_{10}G_i\oplus T'_{11}N_0\oplus C_{2-1i}$, where i=0,1,2. The matrix $T^{-1}$ is used to transform two 4-bit values of the composite field back to a standard 8-bit value; $A_2$ and $C_2$ are the linear and constant parts of the affine transformation of SM4, respectively. The result is that we have obtained six masked values $(t_{0,0}{}^{(0)},t_{0,1}{}^{(0)},t_{0,2}{}^{(0)},s_{0,0}{}^{(0)},s_{0,1}{}^{(0)},s_{0,2}{}^{(0)})$ from the first branch. With the same method used in above subsections, we get $(t_{0,0}{}^{(i)},t_{0,1}{}^{(i)},t_{0,2}{}^{(i)},s_{0,0}{}^{(i)},s_{0,1}{}^{(i)},s_{0,2}{}^{(i)})$ (i=1,2,3) for remaining three branches. To compute $x_{40}$, we multiply $l_{0i}$ with outputs of each branch and add them together:

$$x_{00}\oplus l_{00}\begin{bmatrix} t_0^{(0)}\oplus t_1^{(0)}\oplus t_2^{(0)} \\ s_0^{(0)}\oplus s_1^{(0)}\oplus s_2^{(0)} \end{bmatrix}\oplus l_{01}\begin{bmatrix} t_0^{(1)}\oplus t_1^{(1)}\oplus t_2^{(1)} \\ s_0^{(1)}\oplus s_1^{(1)}\oplus s_2^{(1)} \end{bmatrix}\oplus =$$

$$\begin{bmatrix} x_{00}^0 \\ x_{00}^1 \end{bmatrix}\oplus\begin{bmatrix} P_{00-00} & P_{00-01} \\ P_{00-10} & P_{00-11} \end{bmatrix}\begin{bmatrix} t_0^{(0)}\oplus t_1^{(0)}\oplus t_2^{(0)} \\ s_0^{(0)}\oplus s_1^{(0)}\oplus s_2^{(0)} \end{bmatrix}\oplus l_{02}\begin{bmatrix} t_0^{(2)}\oplus t_1^{(2)}\oplus t_2^{(2)} \\ s_0^{(2)}\oplus s_1^{(2)}\oplus s_2^{(2)} \end{bmatrix}\oplus$$

-continued $$l_{03}\begin{bmatrix} t_0^{(3)}\oplus t_1^{(3)}\oplus t_2^{(3)} \\ s_0^{(3)}\oplus s_1^{(3)}\oplus s_2^{(3)} \end{bmatrix}\begin{bmatrix} P_{01-00} & P_{01-01} \\ P_{01-10} & P_{01-11} \end{bmatrix}\begin{bmatrix} t_0^{(1)}\oplus t_1^{(1)}\oplus t_2^{(1)} \\ s_0^{(1)}\oplus s_1^{(1)}\oplus s_2^{(1)} \end{bmatrix}\oplus$$

$$\begin{bmatrix} P_{02-00} & P_{02-01} \\ P_{02-10} & P_{02-11} \end{bmatrix}\begin{bmatrix} t_0^{(2)}\oplus t_1^{(2)}\oplus t_2^{(2)} \\ s_0^{(2)}\oplus s_1^{(2)}\oplus s_2^{(2)} \end{bmatrix}\oplus\begin{bmatrix} P_{03-00} & P_{03-01} \\ P_{03-10} & P_{03-11} \end{bmatrix}\begin{bmatrix} t_0^{(3)}\oplus t_1^{(3)}\oplus t_2^{(3)} \\ s_0^{(3)}\oplus s_1^{(3)}\oplus s_2^{(3)} \end{bmatrix}$$

Where $$l_{0h}=\begin{bmatrix} P_{0h-00} & P_{0h-01} \\ P_{0h-10} & P_{0h-11} \end{bmatrix},$$

$P_{0h-ju}$ is a 4×4 block matrix.

By adding part of the upper half part of each matrix, we get a masked value of $x_{40}{}^0$. We can construct 16 lookup tables to implement this step. This data flow is depicted at 1200 in FIG. 12, where i=1, j=0.

Figure 12:
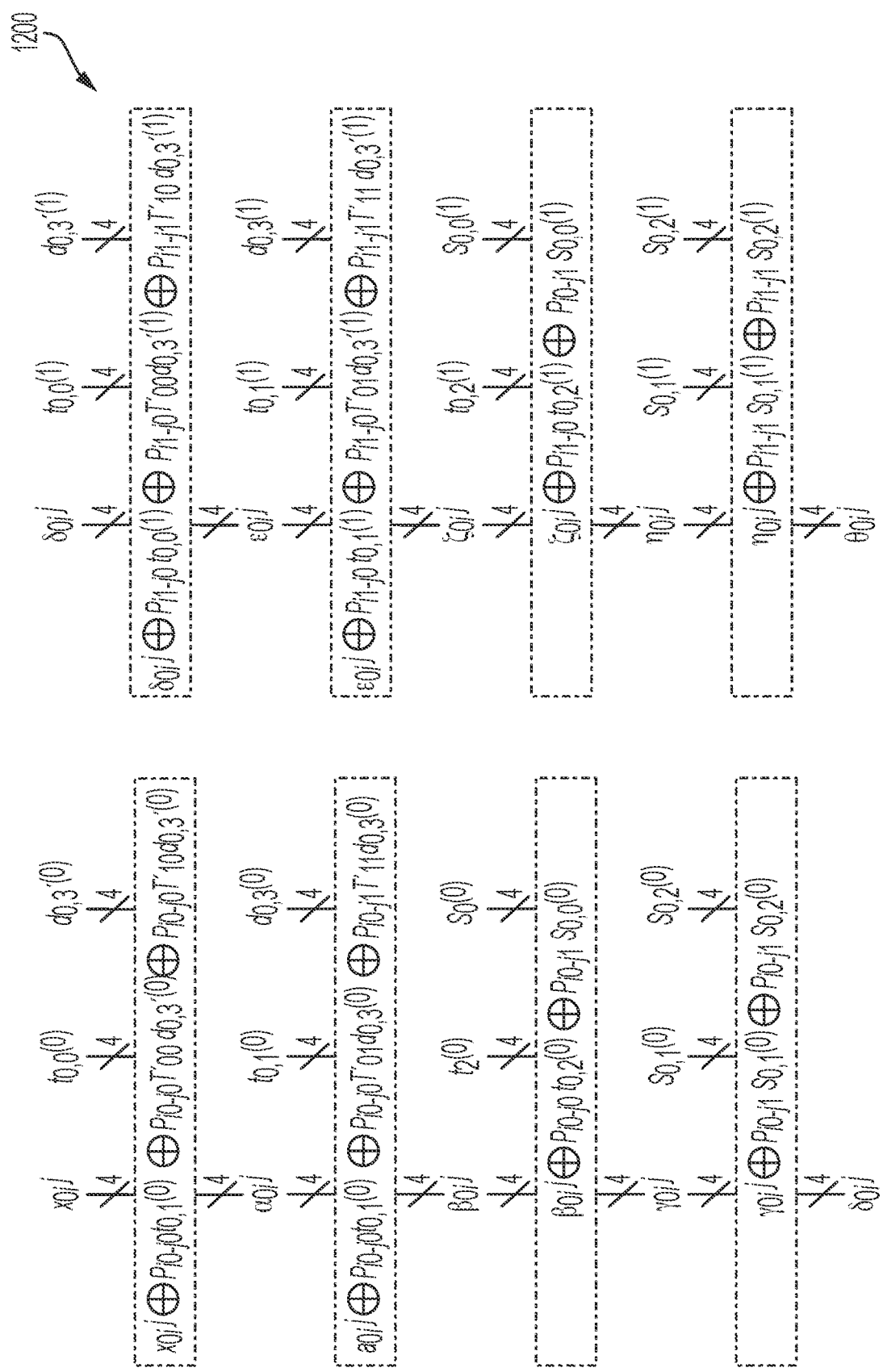
FIG. 12 is a block diagram of the lookup tables in accordance with the disclosed implementation.
Figure 12:
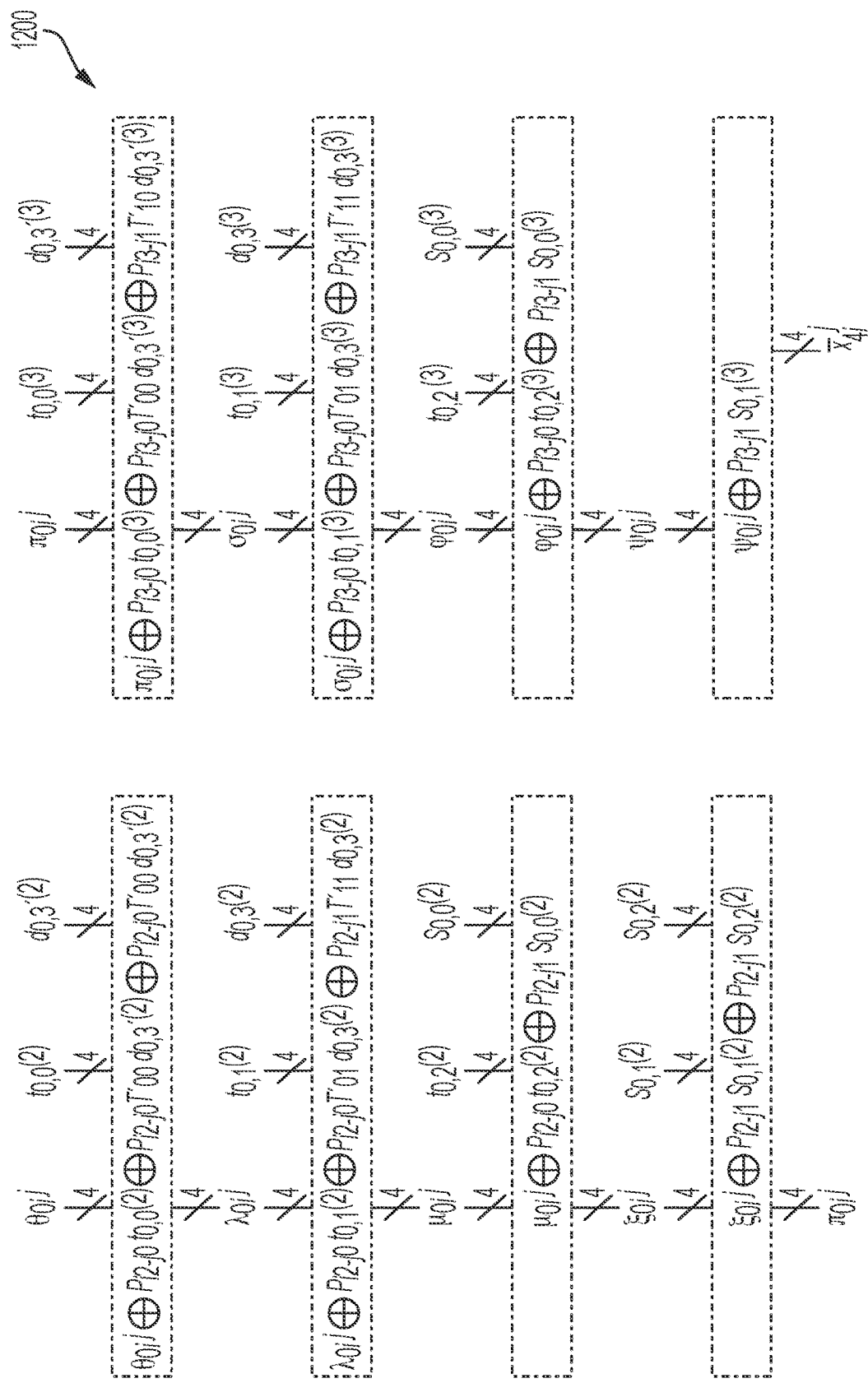

It can be verified that $\bar{x}_{40}{}^0=x_{40}{}^0\oplus P_{03-01}s_2{}^{(3)}$. By adding part of the lower half part of each matrix, the result is a masked value of $x_{40}{}^1$. We construct another 16 lookup tables to compute $\bar{x}_{40}{}^1$. This data flow is also depicted in FIG. 12, except j=1. One can verify that $\bar{x}_{40}{}^1=x_{40}{}^1\oplus P_{03-11}s_{0,2}{}^{(3)}$.

Let $$l_{1h}=\begin{bmatrix} P_{1h-00} & P_{1h-01} \\ P_{1h-10} & P_{1h-11} \end{bmatrix}, l_{2h}=\begin{bmatrix} P_{2h-00} & P_{2h-01} \\ P_{2h-10} & P_{2h-11} \end{bmatrix}, \text{and } l_{3h}=\begin{bmatrix} P_{3h-00} & P_{3h-01} \\ P_{3h-10} & P_{3h-11} \end{bmatrix}$$

where $P_{ih-ju}$ is a 4×4 block matrix, i=1,2,3; j=0,1; u=0,1.

Other three masked bytes of $X_4$ are generated in a similar way. At this time, 16 lookup tables are constructed to compute $\bar{x}_{41}{}^0, \bar{x}_{41}{}^1, \bar{x}_{42}{}^0, \bar{x}_{43}{}^0$ and $\bar{x}_{43}{}^1$ respectively. The data flows are the same as depicted in FIG. 12, except i=1,2,3 j=0,1 for $\bar{x}_{4i}{}^j$.

One can verify that $\bar{x}_{41}{}^0=x_{41}{}^0\oplus P_{13-01}s_{0,2}{}^{(3)}$, $\bar{x}_{41}{}^1=x_{41}{}^1\oplus P_{13-11}s_{0,2}{}^{(3)}$, $\bar{x}_{42}{}^0=x_{42}{}^0\oplus P_{23-01}s_{0,2}{}^{(3)}$, $\bar{x}_{42}{}^1=x_{42}{}^1\oplus P_{23-11}s_{0,2}{}^{(3)}$, $\bar{x}_{43}{}^0=x_{43}{}^0\oplus P_{33-01}s_{0,2}{}^{(3)}$ and $\bar{x}_{43}{}^1=x_{43}{}^1\oplus P_{33-11}s_{0,2}{}^{(3)}$.

Figure 13:
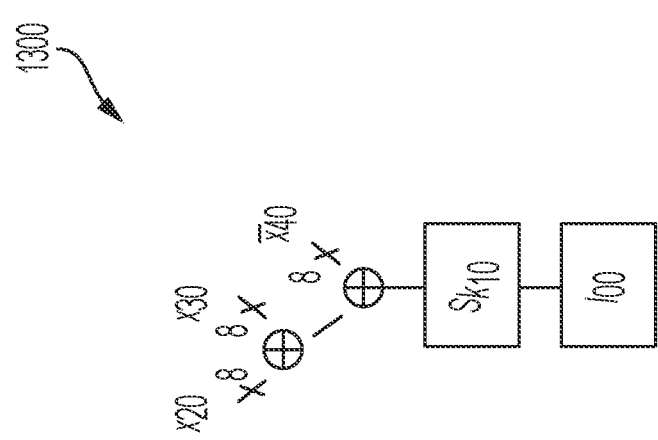
FIG. 13 is a block diagram of a computation of the first branch of the second round in accordance with a disclosed implementation.
Figure 14:
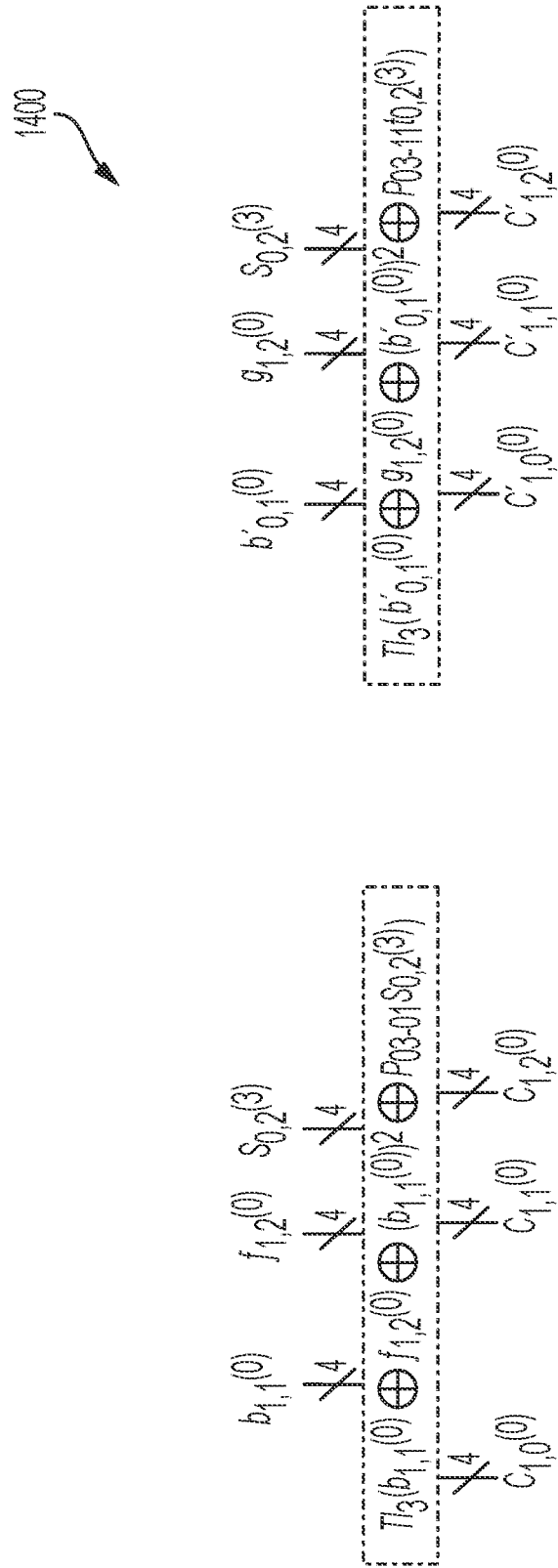
FIG. 14 is a block diagram of mask cancellation data flow in accordance with a disclosed implementation.
Figure 15:
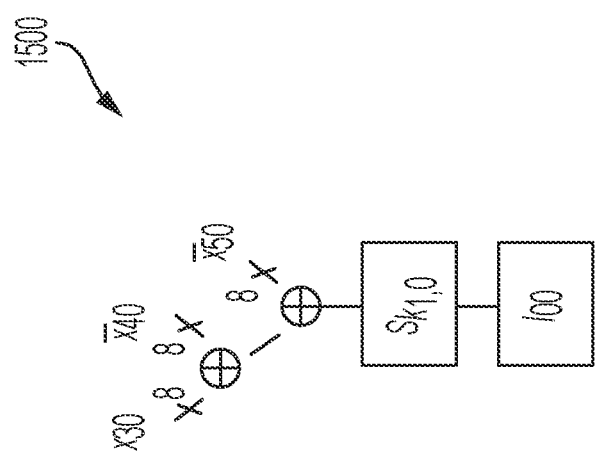
FIG. 15 is a block diagram of a computation of the first branch of the third round in accordance with a disclosed implementation.
Figure 16:
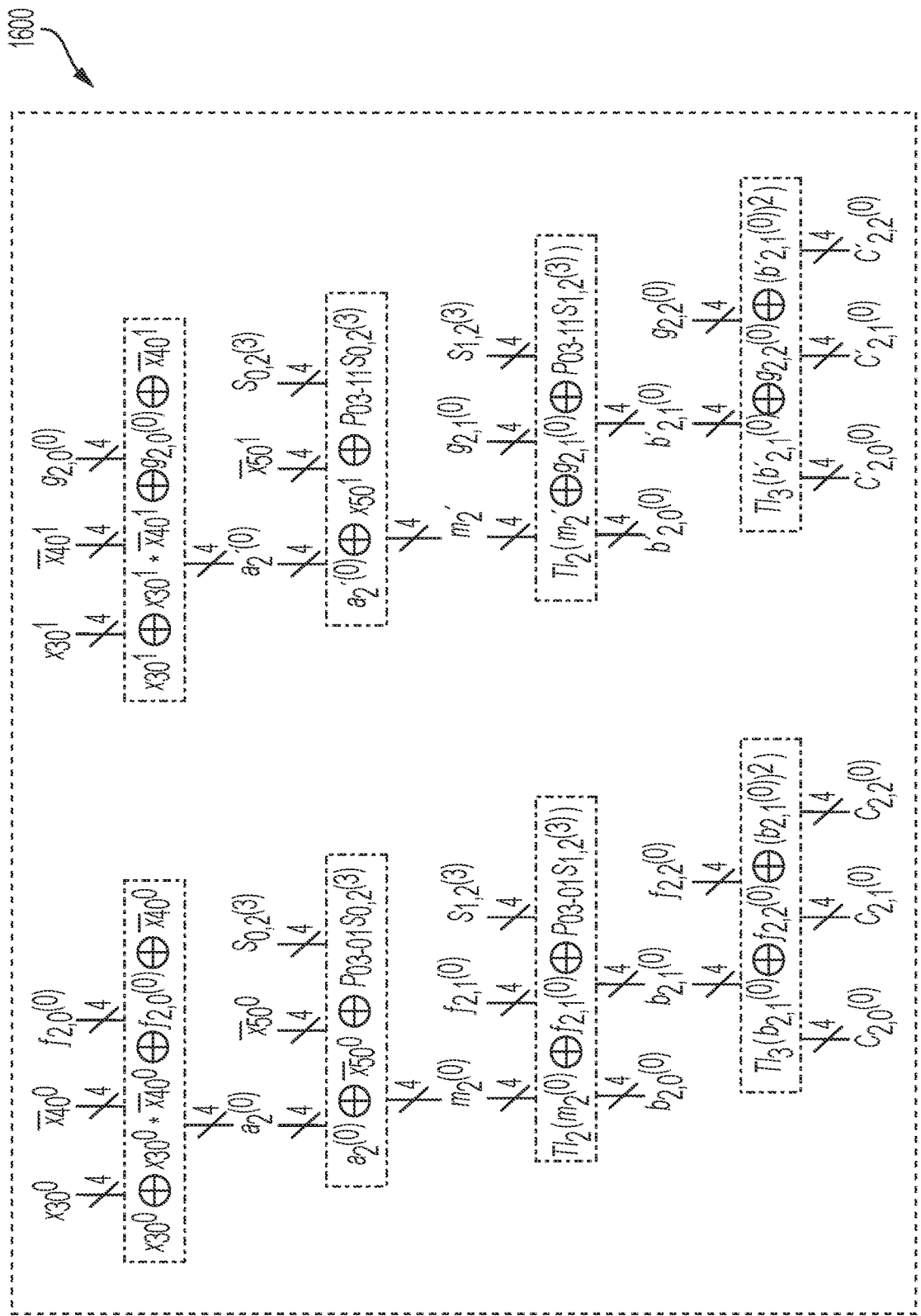
FIG. 16 is a block diagram of a computation of the addition operation of the first branch of the third round in accordance with a disclosed implementation.

For a second round the first branch of this round is also used, as shown at 1300 in FIG. 13, as an example. In this branch, all the steps are the same as in first branch of first round, except for the addition operation. Since $\bar{x}_{40}=(x_{40}{}^0\oplus P_{03-01}s_{0,2}{}^{(3)}\|(x_{40}{}^1\oplus P_{03-11}s_{0,2}{}^{(3)})$ is a masked data, the masks should be cancelled in the addition operation. The lookup tables are only changed in step 3, i.e. use threshold implementation (TI$_3$) of 4 input shares and 3 output shares to compute $F(X,Y,Z)=X\oplus(X)^2\oplus Y\oplus P_{03-01}Z$, and $G(X,Y,Z)=X\oplus(X)^2\oplus Y\oplus P_{03-11}Z$. This data flow is depicted at 1400 in FIG. 14. The result of this round is:

$$\bar{x}_{50}{}^0=x_{50}{}^0\oplus P_{03-01}s_{1,2}{}^{(3)}\bar{x}_{50}{}^1=x_{50}{}^1\oplus$$
$P_{03-11}s_{1,2}{}^{(3)}$,
$P_{13-}$ $_{01}s_{1,2}{}^{(3)}$,
$P_{13-12}s_{1,2}{}^{(3)}$,
$P_{23-01}s_{1,2}{}^{(3)}$,
$P_{23-11}s_{1,2}{}^{(3)}$,
$P_{33-01}s_{1,2}{}^{(3)}, \bar{x}_{53}{}^1=x_{53}{}^1\oplus P_{33-13}s_{1,2}{}^{(3)}$.
$\bar{x}_{51}{}^0=x_{51}{}^0\oplus$
$\bar{x}_{51}{}^1=x_{51}{}^1\oplus$
$\bar{x}_{52}{}^0=x_{52}{}^0\oplus$
$\bar{x}_{52}{}^1=x_{52}{}^1\oplus$
$\bar{x}_{53}{}^0=x_{53}{}^0\oplus$ FIG. 15, at 1500, illustrates data flow of a first branch of a third round. The first branch of this round is as follows and is shown at 1600 in FIG. 16. Similar to the second round, all steps are the same as in the first branch of the first round, except for the addition operation. Since $x_{40}$ and $x_{50}$ masked data, the masks can be cancelled in this part. We only change the lookup tables in step 2, i.e. use threshold implementation (TI$_2$) of 2 input shares and 2 output shares to compute $F(X,Y,Z)=X\oplus Y\oplus P_{03-01}Z$ and $G(X,Y,Z)=X\oplus Y\oplus P_{03-11}Z$.

The result of this round is:

$$\bar{x}_{60}{}^0 = x_{60}{}^0 \oplus P_{03\text{-}01} s_{2,2}{}^{(3)}, \quad \bar{x}_{60}{}^1 = x_{60}{}^1 \oplus P_{03\text{-}11} s_{2,2}{}^{(3)},$$
$$\bar{x}_{61}{}^0 = x_{61}{}^0 \oplus P_{03\text{-}01} s_{2,2}{}^{(3)},$$

$$\bar{x}_{61}{}^1 = x_{61}{}^1 \oplus P_{13\text{-}11} s_{2,2}{}^{(3)}, \quad \bar{x}_{62}{}^0 = x_{62}{}^0 \oplus P_{23\text{-}01} s_{2,2}{}^{(3)},$$

$$\bar{x}_{62}{}^1 = x_{62}{}^1 \oplus P_{23\text{-}11} s_{2,2}{}^{(3)},$$

$$\bar{x}_{63}{}^0 = x_{63}{}^0 \oplus P_{33\text{-}01} s_{2,2}{}^{(3)},$$

$$\bar{x}_{63}{}^1 = x_{63}{}^1 \oplus P_{33\text{-}11} s_{2,2}{}^{(3)},$$

Figure 17:
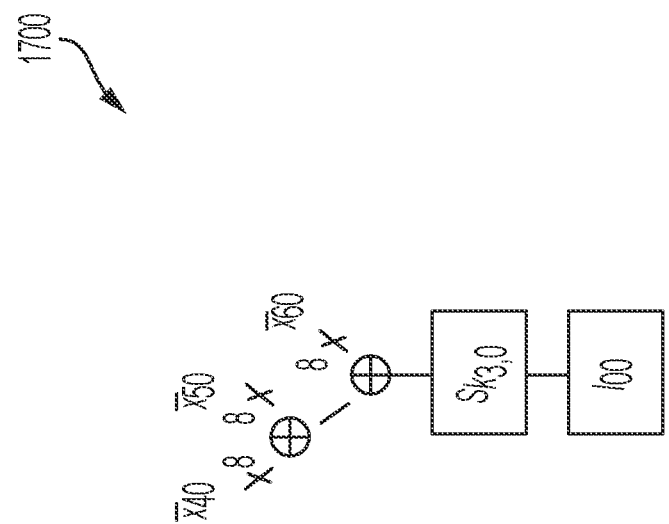
FIG. 17 is a block diagram of a computation of the first branch of the fourth round in accordance with a disclosed implementation.
Figure 18:
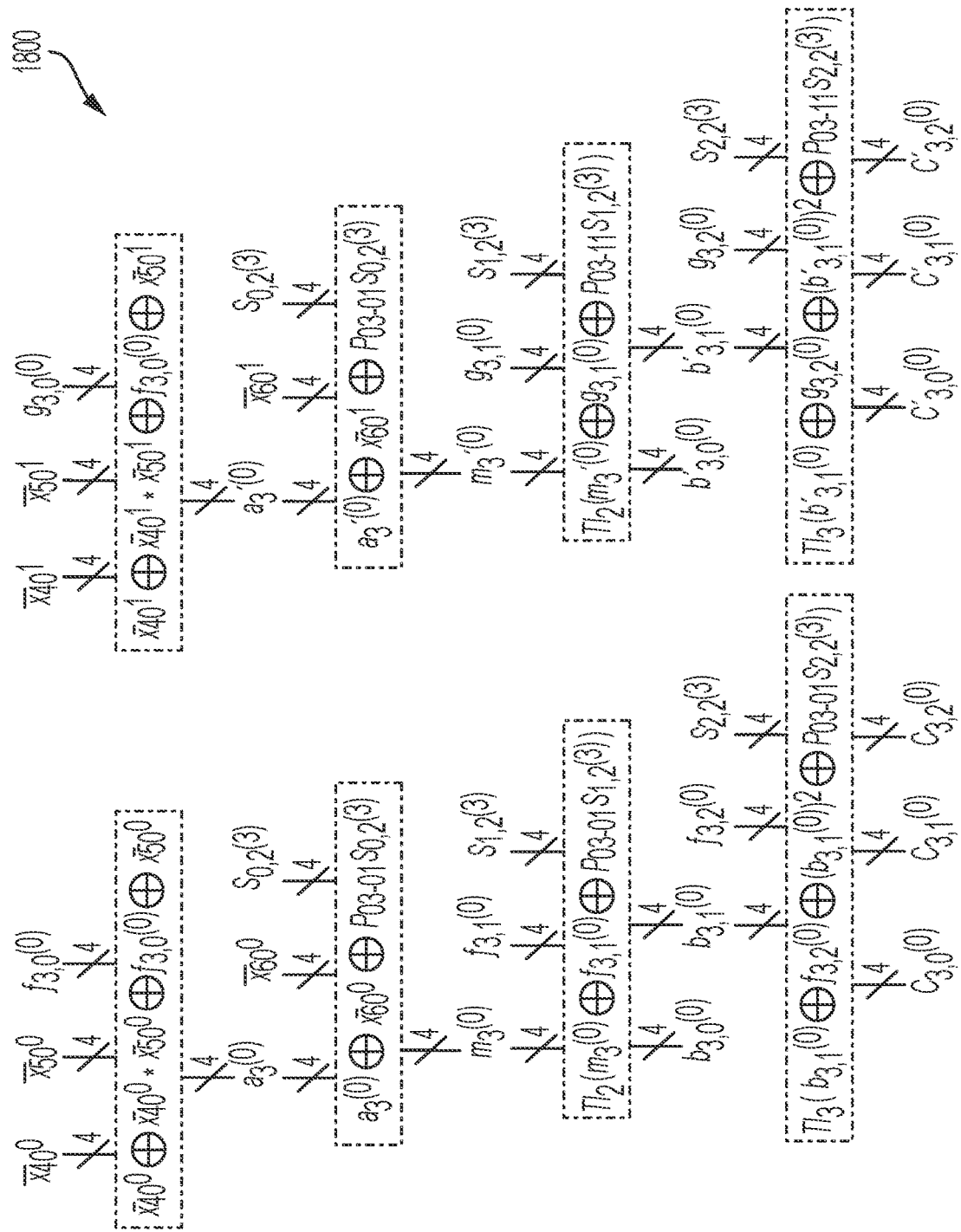
FIG. 18 is a block diagram of a computation of the addition operation of the first branch of the fourth round in accordance with a disclosed implementation.

The processing of the first branch of the fifth round is shown at 1700 of FIG. 17. Similar to the second and third rounds, all steps are the same as in the first branch of the first round, except the Addition operation. Lookup tables generated in previous rounds are reused here, as shown at 1800 of FIG. 18. The result of this round is:

$$\bar{x}_{70}{}^0 = x_{70}{}^0 \oplus P_{03\text{-}01} s_{3,2}{}^{(3)},$$
$$\bar{x}_{70}{}^1 = x_{70}{}^1 \oplus P_{03\text{-}11} s_{3,2}{}^{(3)},$$
$$\bar{x}_{71}{}^0 = x_{71}{}^0 \oplus P_{13\text{-}01} s_{3,2}{}^{(3)},$$
$$\bar{x}_{71}{}^1 = x_{71}{}^1 \oplus P_{13\text{-}11} s_{3,2}{}^{(3)},$$
$$\bar{x}_{72}{}^0 = x_{72}{}^0 \oplus P_{23\text{-}01} s_{3,2}{}^{(3)},$$
$$\bar{x}_{72}{}^1 = x_{72}{}^1 \oplus P_{23\text{-}11} t_{3,2}{}^{(3)},$$
$$\bar{x}_{73}{}^0 = x_{73}{}^0 \oplus P_{33\text{-}01} s_{3,2}{}^{(3)},$$
$$\bar{x}_{73}{}^1 = x_{73}{}^1 \oplus P_{33\text{-}11} s_{3,2}{}^{(3)},$$

Figure 19:
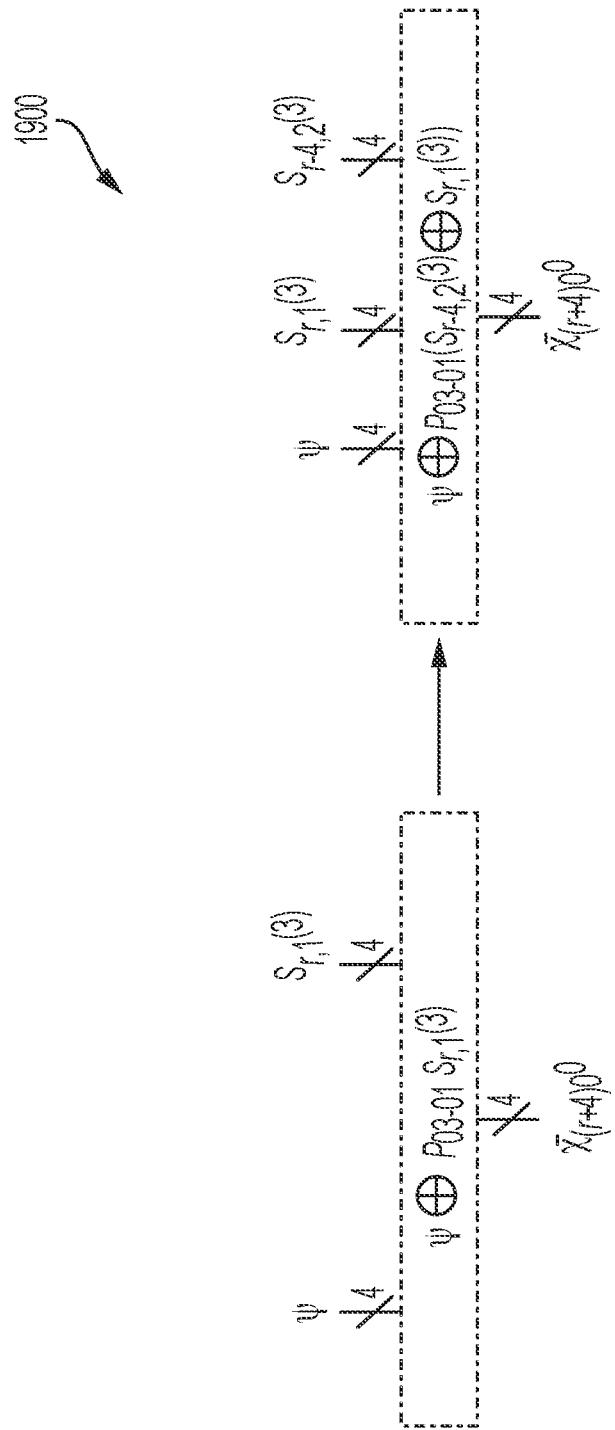
FIG. 19 is a block diagram of the changed lookup tables in accordance with a disclosed implementation.

For remaining rounds, the data flow is the same as in the fourth round except in Compute $X_{40}$ and Remaining three bytes of $X_4$. Since, in the fifth round, all inputs are masked data. The two-input lookup tables in Part V: Compute $X_{40}$ can be changed to three-input lookup tables to cancel an additional mask, and other lookup tables remain the same. The first nibble is used as an example and FIG. 19 indicates the changed tables and the data flow at 1900. For other nibbles, the lookup table can be changed in a similar manner.

Figure 20:
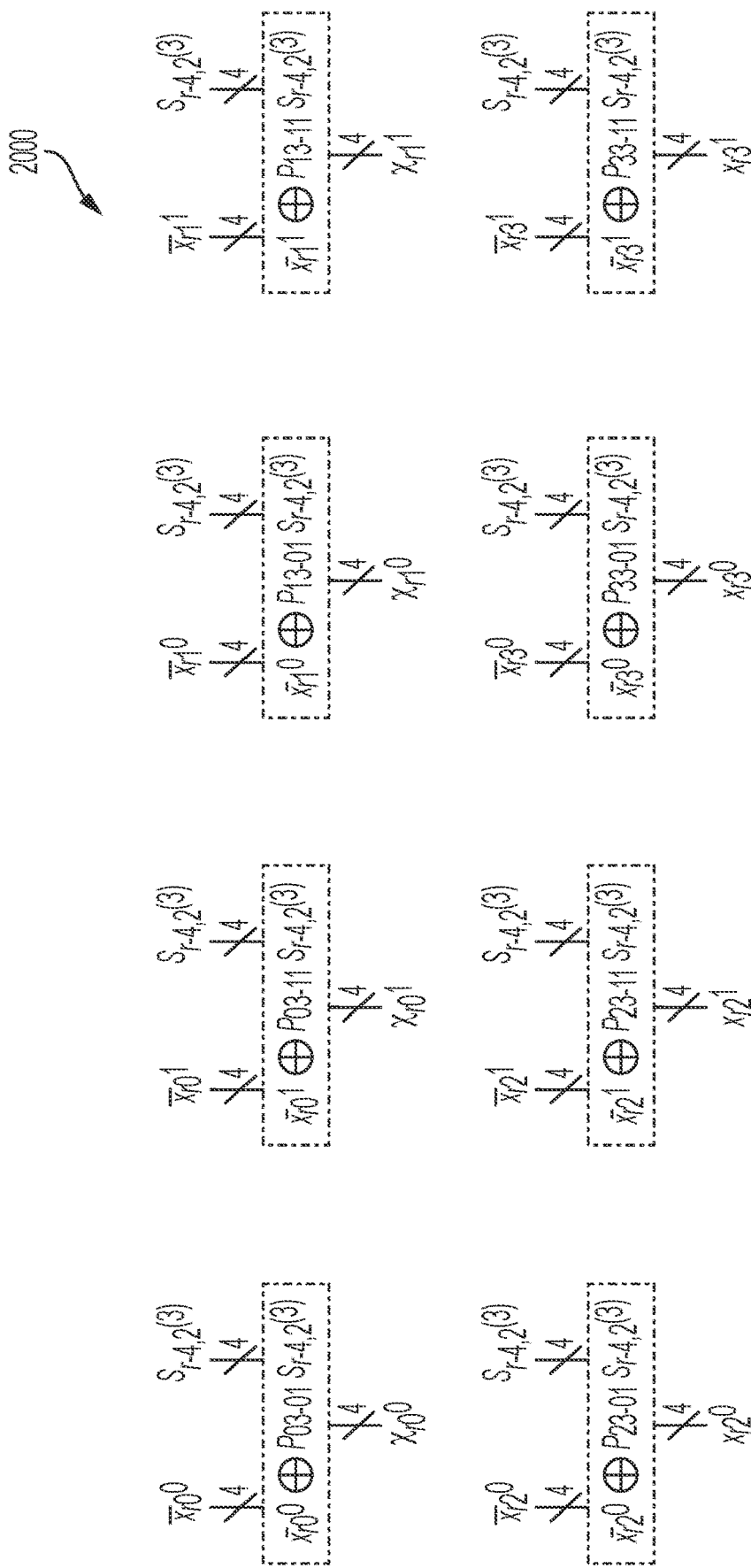
FIG. 20 is a block diagram of the computation for ciphertext recovery in accordance with a disclosed implementation.

After the last round, masked cipher texts ($\bar{X}_{32}, \bar{X}_{33}, \bar{X}_{34}, \bar{X}_{35}$) were obtained, where $x_r$ can be divided into eight 4-bit nibbles: $\bar{X}_r = (\bar{x}_{r0}{}^0 \| \bar{x}_{r0}{}^0) \| (\bar{x}_{r1}{}^0 \| \bar{x}_{r1}{}^1) \| (\bar{x}_{r2}{}^0 \| \bar{x}_{r2}{}^1) \| (\bar{x}_{r3}{}^0 \| \bar{x}_{r3}{}^1)$, where $\bar{x}_{r0}{}^0 = x_{r0}{}^0 \oplus P_{03\text{-}01} s_{r\text{-}4,2}, \quad \bar{x}_{r0}{}^1 = x_{r0}{}^1 \oplus P_{03\text{-}11} s_{r\text{-}r,2}{}^{(3)},$
$\bar{x}_{r1}{}^0 = x_{r1}{}^0 \oplus P_{13\text{-}01} s_{r\text{-}4,2}{}^{(3)}, \quad \bar{x}_{r1}{}^1 = x_{r1}{}^1 \oplus P_{13\text{-}11} s_{r\text{-}4,2}{}^{(3)},$
$\bar{x}_{r2}{}^0 = x_{r2}{}^0 \oplus P_{23\text{-}01} s_{r\text{-}4,2}{}^{(3)}, \quad \bar{x}_{r2}{}^1 = x_{r2}{}^1 \oplus P_{23\text{-}11} s_{r\text{-}4,2}{}^{(3)},$
$\bar{x}_{r3}{}^0 = x_{r3}{}^0 \oplus P_{33\text{-}01} s_{r\text{-}4,2}{}^{(3)}, \quad \bar{x}_{r3}{}^1 = x_{r3}{}^1 \oplus P_{33\text{-}11} s_{r\text{-}4,2}{}^{(3)}.$ Now eight lookup tables can be constructed for eight functions as shown at 2000 of FIG. 20:

$$F_0(X,Y) = X \oplus P_{03\text{-}01} Y, \quad F_1(X,Y) = X \oplus P_{03\text{-}11} Y$$

$$F_3(X,Y) = X \oplus P_{13\text{-}01} Y, \quad F_3(X,Y) = X \oplus P_{13\text{-}11} Y$$
$$F_4(X,Y) = X \oplus P_{23\text{-}01} Y,$$

$$F_5(X,Y) = X \oplus P_{23\text{-}11} Y \quad F_6(X,Y) = X \oplus P_{33\text{-}01} Y,$$
$$F_7(X,Y) = X \oplus P_{31\text{-}11} Y$$

The result is the following cipher text:

$$X_{32} = x_{(32)0}{}^0 \| x_{(32)0}{}^1 \| x_{(32)1}{}^0 \| x_{(32)1}{}^1 \| x_{(32)2}{}^0 \| x_{(32)2}{}^1 \| x_{(32)3}{}^0 \| x_{(32)3}{}^1$$

$$X_{33} = x_{(33)0}{}^0 \| x_{(33)0}{}^1 \| x_{(33)1}{}^0 \| x_{(33)1}{}^1 \| x_{(33)2}{}^0 \| x_{(33)2}{}^1 \| x_{(33)3}{}^0 \| x_{(33)3}{}^1$$

$$X_{34} = x_{(34)0}{}^0 \| x_{(34)0}{}^1 \| x_{(34)1}{}^0 \| x_{(34)1}{}^1 \| x_{(34)2}{}^0 \| x_{(34)2}{}^1 \| x_{(34)3}{}^0 \| x_{(34)3}{}^1$$

$$X_{35} = x_{(35)0}{}^0 \| x_{(35)0}{}^1 \| x_{(35)1}{}^0 \| x_{(35)1}{}^1 \| x_{(35)2}{}^0 \| x_{(35)2}{}^1 \| x_{(35)3}{}^0 \| x_{(35)3}{}^1$$

One important criterion for any white-box implementation is performance. The performance of the above implementation is evaluated below. As a first step, storage cost of the lookup tables was evaluated through the following algorithm.

For $0 \leq r \leq 31$:

In Part I: Generate masks, there is only one lookup table for all branches and rounds. The storage cost is $2^{8 \times 12}$ bits.

In Part II: Addition operation, there are three lookup tables in the first round. In the second and third rounds, one additional lookup table is generated respectively. The five lookup tables are shared for all the rounds and branches. The storage cost is $2 \times 2^{12} \times 4 + 1 \times 2^{12} \times 8 + 1 \times 2^8 \times 12 + 1 \times 2^{12} \times 12$ bits.

In Part III Compute $A_1 x$, there are six lookup tables for all rounds and all branches. The storage cost is $6 \times 2^{12} \times 4$ bits.

In Part IV Create a T-box, since the round key is different for each round, the T-box must be generated in each round and each branch. The storage cost is $4 \times 2^{12} \times 24 \times 32$ bits.

In Part V: Compute $X_{40}$ and Part VI: Remaining three bytes of $X_4$, there are 32 lookup tables for one branch. After four rounds, eight lookup tables must be added. The storage cost is $(15 \times 2^{12} \times 4 + 2^8 \times 4) \times 8 + 8 \times 2^{12} \times 4$ bits-1.5MB. As noted above, the implementation has 276 lookup tables. The last two parts have the highest storage requirements. In Part IV: Create T-box, a T-box is generated for each key byte to keep the secret key in the only non-linear component of the algorithm. To reduce the storage requirement, the key byte can be moved from the T-box and embedded into a small lookup table. The effect is that only one T-box will exist for all rounds and all branches. Another way to reduce storage requirements is to use matrix operations instead of lookup tables in Part V: Compute X4o and Part VI: Remaining three bytes of X4. Both methods trade security for performance. The above storage cost analysis was conducted on a PC (CPU E3-1240 v5@ 3.50 GHz, Memory: 16 GB). The experiment showed that the throughput of the implementation is 119 KB/s.

It is axiomatic that a primary criterion for a block cipher is security. The three main cryptographic system attack models of interest include black-box, grey-box, and white-box attacks. Black-box is a traditional attack model in which an adversary only has access to the inputs and outputs of a cryptosystem. As an official encryption standard, SM4 has good performance in resisting classical attacks on block ciphers such as differential and linear attacks.

"Grey-box" is an attack model where the adversary can use leaked information to deploy side-channel cryptanalysis. Different leaked information can lead to different grey-box attacks. DCA (Differential computation analysis) is a powerful side-channel attack against white-box implementations of a cryptosystem. The main reason that DCA is successful is due to the nonnegligible correlation between the expected values (from the standard cipher specification) and the masked intermediate values (from the white-box implementation), which is caused by the linear imbalances in encodings used in white-box implementation. The disclosed implementation is DCA resistant because when the inputs are uniformly distributed, the outputs from the threshold implementation are uniformly distributed, so that the data correlations between SM4 and its white-box implementation are weakened.

In a white-box attack model, a practical symmetric encryption implementation cannot usually find a strict security proof. Instead of reducing the white-box security into solving a computationally infeasible mathematical problem, security of a white-box implementation is assessed by checking whether it is secure against known attacks. The security of the disclosed implementation against two well-known white-box attacks, the BGE attack and the affine equivalence attack, is evaluated below.

The earliest attack against a white-box implementation beyond grey-box attacks is the BGE attack. This attack was originally constructed to recover the round key of the Chow et al.'s white-box AES implementation. The white-box AES implementation includes several phrases (external input and output encodings are exclusive):

1. The round key is embedded into the S-box by replacing each S-box with a T-box:

$$T_{i,j}^r(x)=s(x \oplus k_{i,j}^r),$$

$$T_{i,j}^{10}(x)=S(x \oplus k_{i,j}^{10}) \oplus k_{i,j-i}^{11}.$$

2. The 32×32 matrix MC representing MixColumns is split into four 32×8 matrices $MC_i$.

Figure 21:
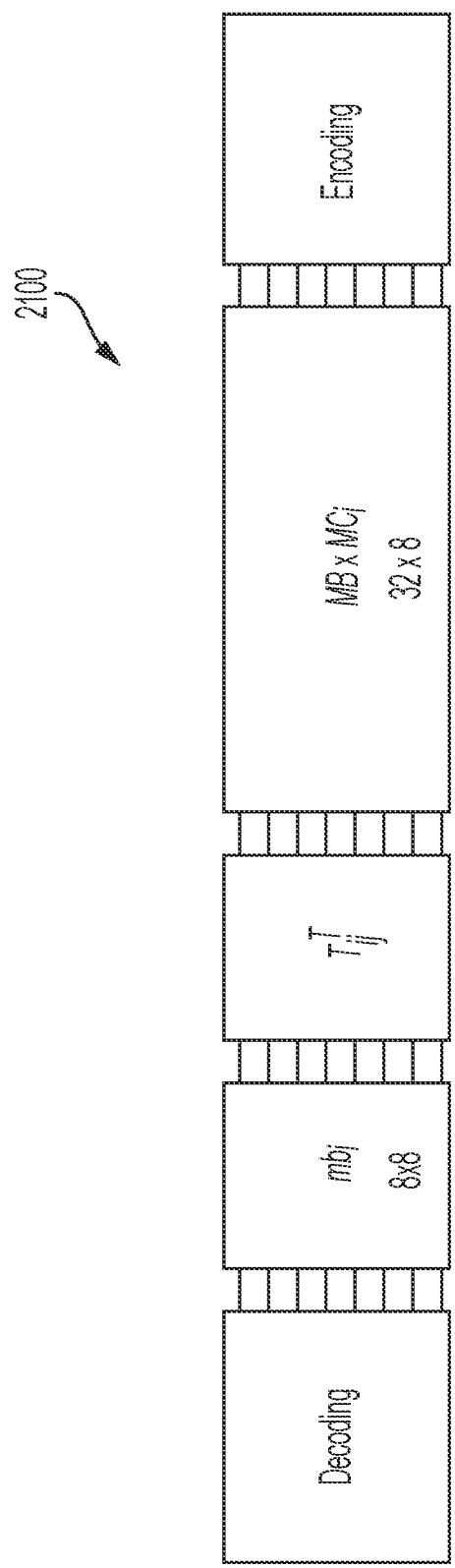
FIG. 21 is a block diagram of a "Type II Table" in accordance with a disclosed implementation.
Figure 22:
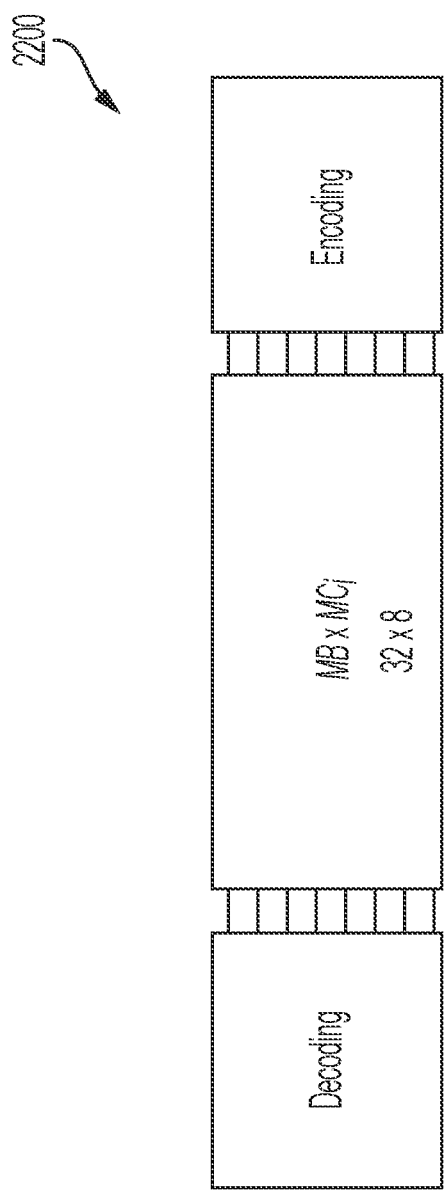
FIG. 22 is a block diagram of a "Type III Table" in accordance with a disclosed implementation.

3. To protect $T_{i,j}^r(x)$, 8×8 affine "mixing" bijection $mb_i$ is inserted before $T_{i,j}^r(x)$ and a 32×32 affine bijection MB is inserted after $MC_i$. Meanwhile, concatenated non-linear permutations are used to decode/encode 4-bit input/output, and known as input decoding/output encoding. The resulting lookup table is named as Type II table and shown in FIG. 21 at 2100. To cancel the effect of MB, a lookup table takes care of the inversion. The inverse of MB is pre-multiplied by the inverse of the appropriate four mix bijections and split into four submatrices ($MB^{-1}$) This lookup table is named Type III table and is shown at 2200 in FIG. 22.

Figure 23:
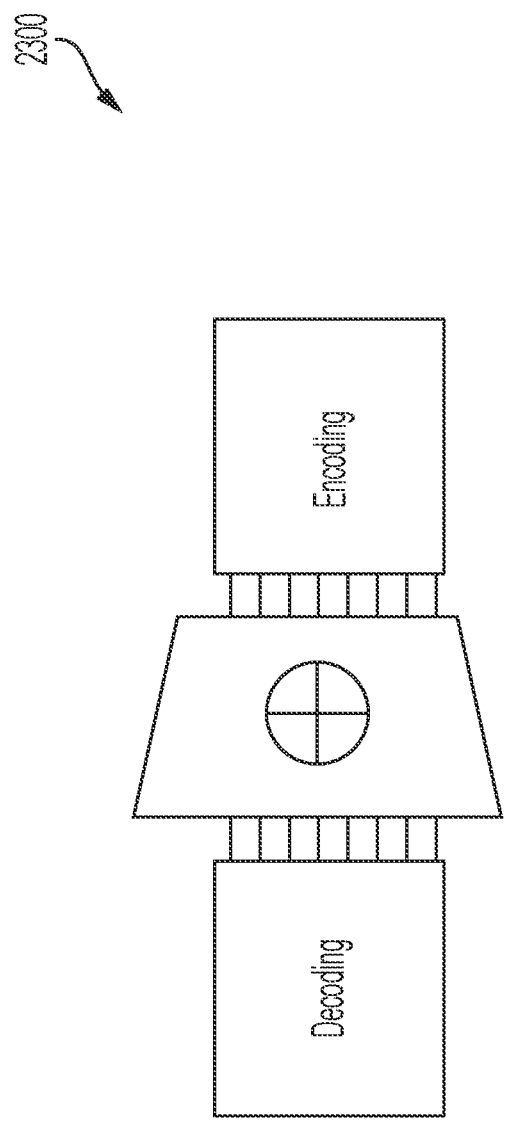
FIG. 23 is a block diagram of a "Type Iv Table" in accordance with a disclosed implementation.

5. Four bytes from one column is processed in parallel with the previous steps and combined with an XOR operation, and called Type IV table, as shown in FIG. 23 at 2300. A BGE attack process is summarized below.

Figure 24:
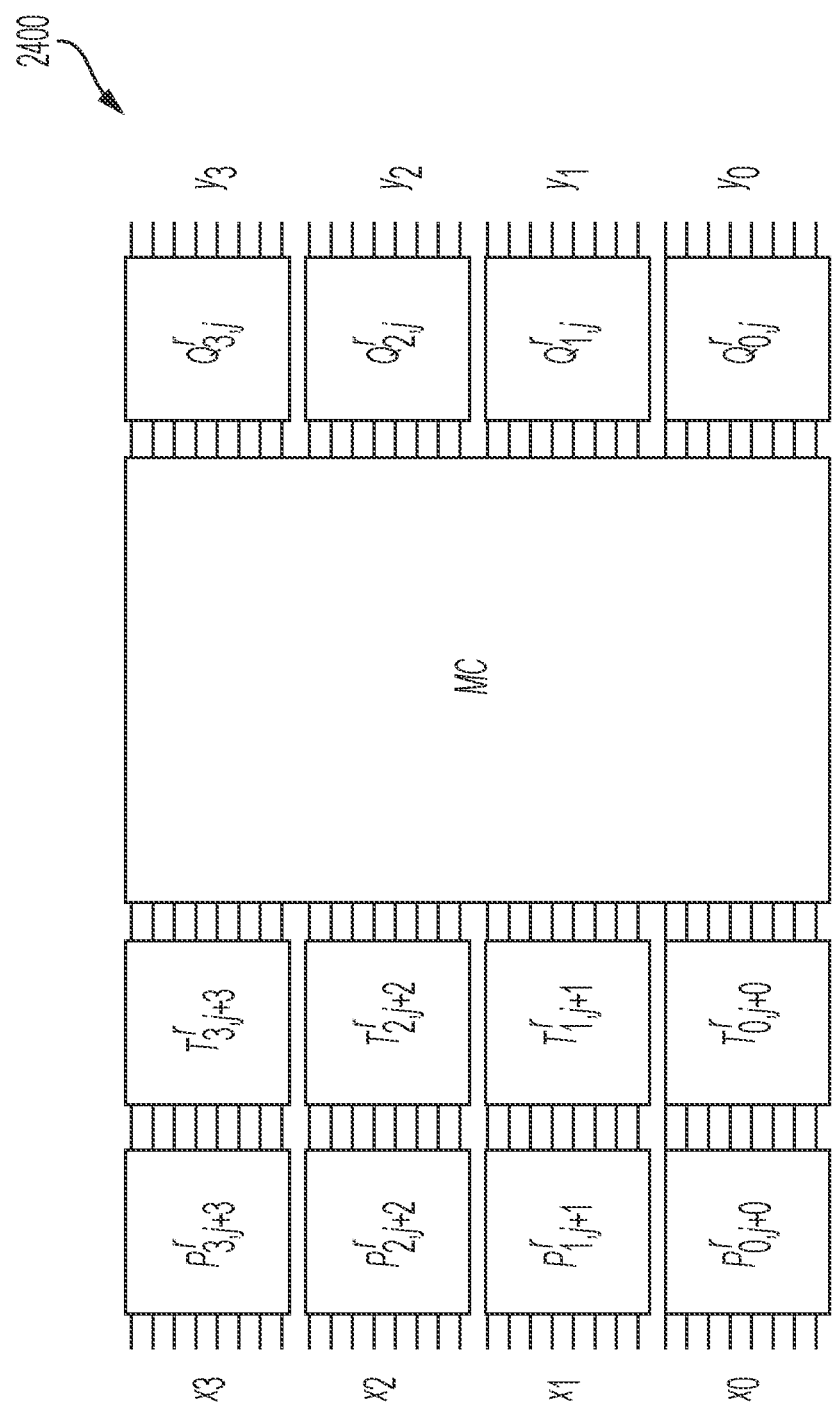
FIG. 24 is a block diagram of a combined lookup tables for a single column in accordance with a disclosed implementation.

Phase 1. Combine the lookup tables of four bytes in one column of one round. The effect of MB and adjacent internal encodings are canceled out. Other encodings are left and denoted as $P_{i,j}^r$ and $Q_{i,j}^r$ (2400 in FIG. 24):

Phase 2. Remove the non-linear part of the encoding $Q_{i,j}^r$ (the same as $P_{i,j}^r$).

Phase 3. Retrieve the affine part of encoding $Q_{i,j}^r$ (the same as $P_{i,j}^r$) by the affine relation between function $y_i(x_0,x_1,x_2,x_3)$ and $y_j(x_0,x_1,x_2,x_3)$.

Phase 4. During the affine recovery process, the key-dependent affine mapping $\bar{P}_{i,j}^r(x)=P_{i,j}^r(x) \oplus \bar{k}_{i,j}^r$ are obtained by using inverse of the S-box to cancel out the effect of the S-box in the function $y_i(x_0,x_1,x_2,x_3)$. This enables the key recovery by $\bar{k}_{i,j}^r=\bar{P}_{i,j}^r(x) \oplus P_{i,j}^r(x)$.

Phase 5. Use the same method to recover the round key bytes of round r+1.

The two cornerstones of the BGE attack are Phase 2 and Phase 3. The key point of Phase 3 is the existence of the affine relationship between $y_i(x_0,x_1,x_2,x_3)$ and $y_j(x_0,x_1,x_2, x_3)$. To apply a BGE-like attack on the disclosed implementation, the two phases are checked. Since non-linear encodings are not used in the implementation, Phase 2 can be skipped. For Phase 3, constructing a function set should be considered. The functions are key-dependent, so T-boxes must be included.

Figure 25:
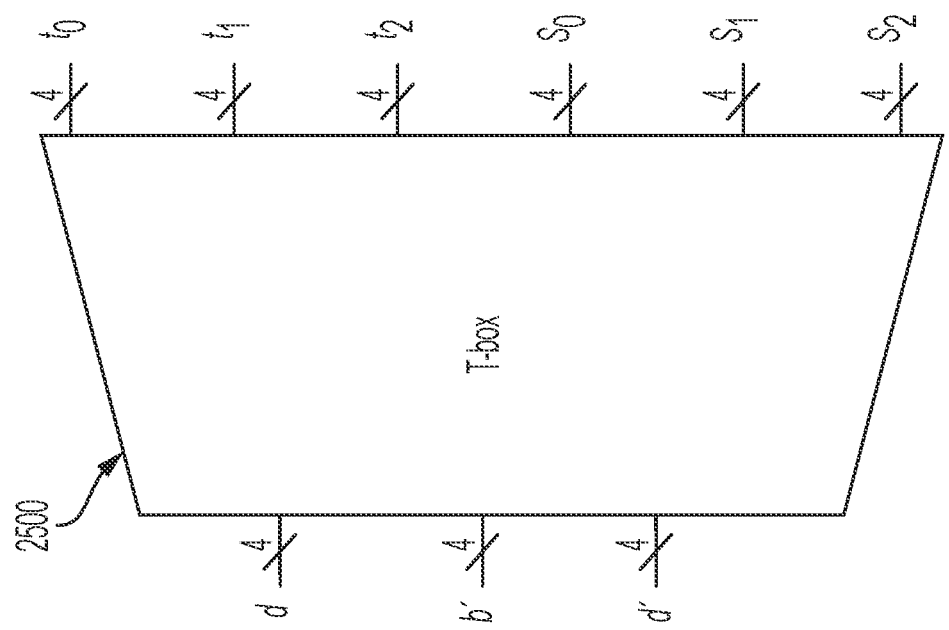
FIG. 25 is a block diagram of a simplified T-box in accordance with a disclosed implementation.

Considering the T-box on its own. Neither $t_j$ nor $s_i$ can be represented as a function of inputs (d, b', d'). The inputs and outputs of T-box 2500 are shown in FIG. 25. The T-box 2500 of FIG. 25 is simplified by dropping some subscripts without loss of generality. $t_j$ and $s_j$ (j=0,1,2) are computed with $G_0,G_1,G_2,N_0,N_1$ and $N_2$, which are outputs from a threshold implementation. Based on the Property 1 of the threshold implementation, each output is independent of at least one share of each of the input variables. In other words, there is no functional relationship exists between the inputs (d, b', d') and each of $G_0,G_1,G_2,N_0,N_1$ and $N_2$. The functions to compute $t_j$ and $s_j$ use $(G_i,N_i)$ as inputs, which means that each of $t_j$ or $s_j$ (j=0,1,2) have no functional relationship with inputs (d, b', d'). Therefore, any combination of lookup tables which end with the T-box cannot be used to construct function set which have an affine relationship.

Figure 26:
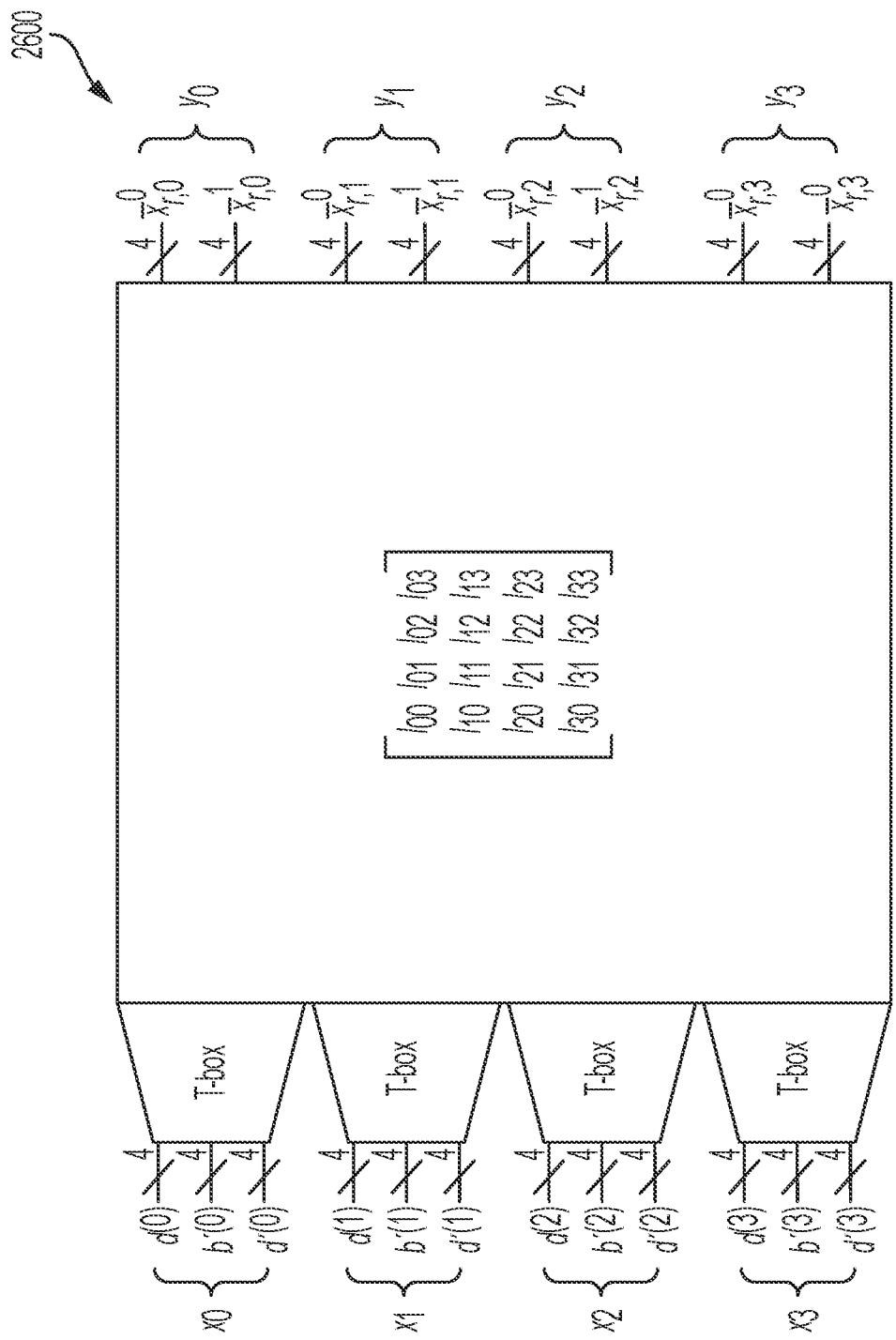
FIG. 26 is a block diagram of 4 T-boxes combined with 8×16 tables in accordance a the disclosed implementation.

Lookup tables that follow the T-box are two sets of 16 tables generated in Part V above. To cancel out the effect of the threshold implementation, we can combine four T-boxes with 8×16 tables from four branches as shown at 2600 in FIG. 26. A function set $\{y_j(x_0,x_1,x_2,x_3)=0,1,2,3\}$ can be obtained and it is easy to prove the functions of the set have an affine relationship. However, note that x, are 12-bit inputs, which does not match the input size of $s^{-1}$. Therefore, the effect of S-box in function $y_i(x_0,x_1,x_2,x_3)$ cannot be canceled out and the attack fails in Phase 4.

Now a look is taken at Affine equivalence attack resistance. For two S-box $s_2(x)$ and $S_i(x)$, the purpose of the affine equivalence algorithm is to test if there exists two invertible n×n matrices $A_i$ and 4, and two n-dimensional vectors $a_1$ and $a_2$ such that $s_2(x)=A_2S_1[A_1(x) \oplus a_1] \oplus a_1$. Several algorithms are presented to solve the affine equivalence problems in Biryukov, A., De Canniere, C., Braeken, A. et al A Toolbox for Cryptanalysis: *Linear and Affine Equivalence Algorithms. Advances in Cryptology*-EUROCRYPT 2003, pp. 33-50, Springer, Berlin Heidelberg, May 2003. Usually, non-linear transformations or affine mappings are used to obscure an S-box. Since the Phase 2 in a BGE attack can be used to remove the non-linear part of the transformation and keep the affine part remaining, an obscured S-box (referred to as a T-box herein) can be affinely equivalent to the original S-box. Therefore, an affine equivalence algorithm is an efficient attack against most conventional white-box implementations. However, such affine equivalence attacks do not apply to the disclosed implementation because the sizes of input and output of T-box are 12 bits and 24 bits respectively, which are different than those of standard S-box, and the matrices $A_1$ and $A_2$, would be non-square.

Conventional white-box implementations split SM4 into several steps and use affine transformation to protect each step. However, the disclosed implementation described above adopts a different approach. The S-box is split into two steps to thereby obscure the boundary of the S-box and help protect the key when it is embedded in the S-box. Second, the elements and operations in $GF(2^8)$ are mapped to a composite field $GF(2^4)^2$, which increase the difficulty to identify the original operations. Third, threshold implementation techniques are used that, weaken the correlation between the white-box implementation and standard SM4. These techniques work together to protect the SM4 under BGE-like attacks, affine equivalence attacks and DCA attacks. Table 1 below compares the disclosed implementation conventional implementations. While the disclosed implementation has larger storage requirements, it has good performance on resisting popular white-box attacks.

TABLE 1

A comparison between WB-SM4 implementations

| | Performance | | Security | | |
|---|---|---|---|---|---|
| | Size of lookup tables | Other operations | BGE attack resistance | Affine equivalence attack resistance | DCA resistance |
| WBSM4 * | 149 KB | Matrix multiplication | No | Unknown | Unknown |
| WBSM4 First algorithm ** | 144 KB | Matrix multiplication | Unknown | No | Unknown |
| The Disclosed Implementation | 1.5 MB | None | Yes | Yes | Yes |

\* Xiao, Y.; Lai, X. White-Box Cryptography and a White-Box Implementation of the SMS4 Algorithm; Shanghai Jiaotong University: Shanghai, China, pp. 24-34, 2009.
\*\* Shi, Y., Wei, W. and He, Z., lightweight white-box symmetric encryption algorithm against node capture for WSNs. Sen-sors, 15(5), pp. 11928-11952, 2015.

The disclosed implementation is based on a composite field and a threshold implementation. The implementation works on 4-bit nibbles instead of on bytes. The threshold implementation makes the distribution of the masked values uniform and independent of the corresponding unmasked values. The operation in a smaller composite field reduce the size of the lookup tables. The disclosed implementation is resistant against traditional white-box attacks, such as the affine equivalence attacks, the BGE-like attacks and DCA-like attacks.

Figure 27:
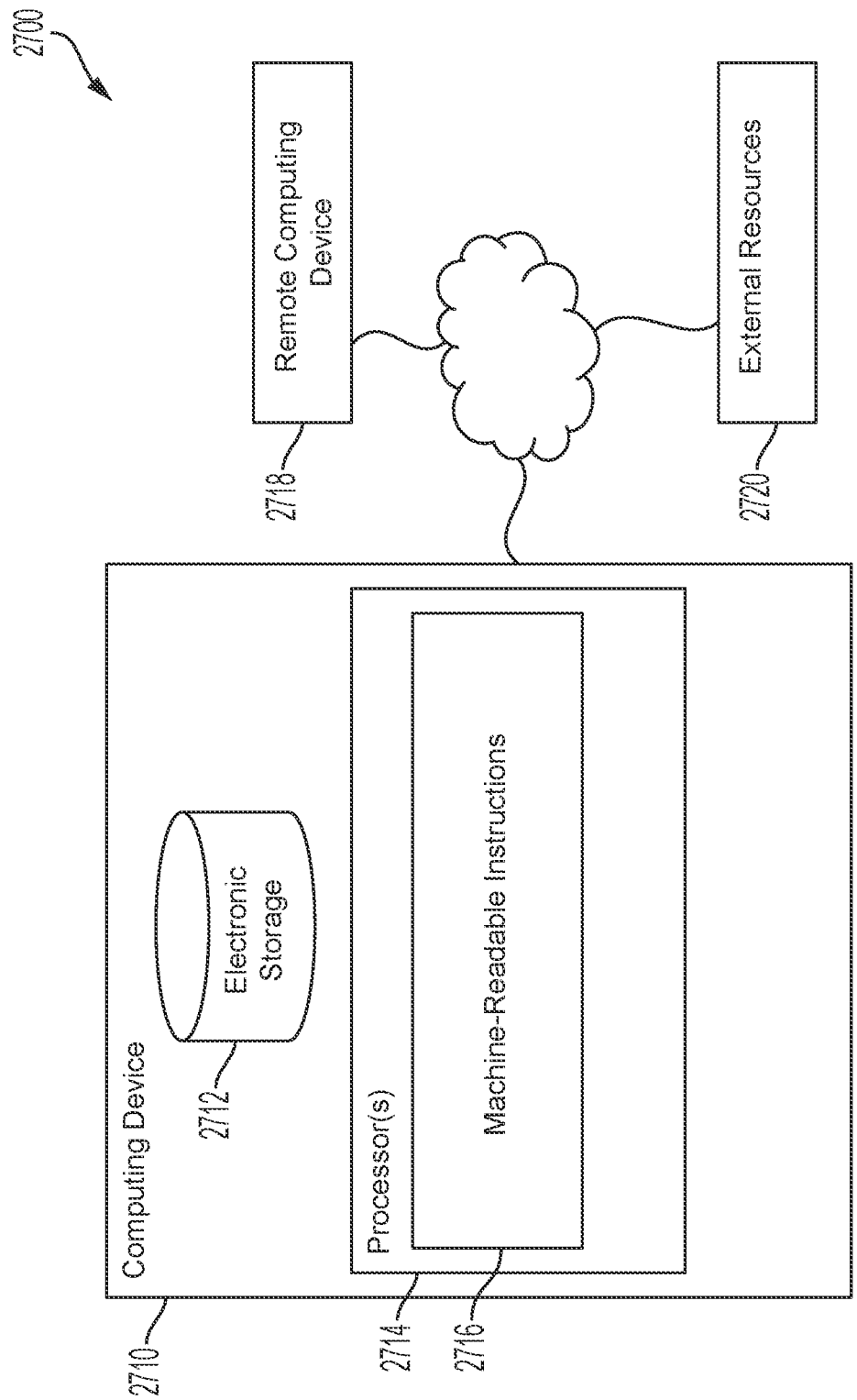
FIG. 27 is a schematic diagram of an architecture for performing the function in accordance with a disclosed implementation.

The above-described implantations may be accomplished by a computer or computing system 2700, as shown in FIG. 27. Computing system 27 can include computing devices 2712 having one or more processors 2714 and one or more memories storing instruction, that when executed by the processors 2714, accomplish the disclosed computations and storage. The computer system can include servers, client computing platforms, and/or external resources 2720, which may be operatively linked via one or more electronic communication links. For example, such electronic communication links may be established, at least in part, via a network such as the Internet and/or other networks. By way of non-limiting example, the computing system may include one or more remote computing devices 2718, including a desktop computer, a laptop computer, a handheld computer, a tablet computing platform, a NetBook, a Smartphone, a gaming console, a server, and/or other computing platforms. The computing devices 2712 may include communication lines, or ports to enable the exchange of information with a network and/or other computing platforms. Memories may include electronic storage devices that may comprise non-transitory storage media that electronically stores information. The electronic storage media of electronic storage may include one or both of system storage that is provided integrally (i.e., substantially non-removable) with computing devices 2712 and/or removable storage that is removably connectable to computing devices 2712 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from computing devices 2712, the described data structures, and/or other information and machine-readable instructions 2716 that the processors 2714 to carry out the functions as described herein.

Processor(s) may include one or more of a digital processors, an analog processor, a digital circuit designed to process information, an analog circuit designed to process information, a state machine, and/or other mechanisms for electronically processing information. Processor(s) may be configured to execute modules by software; hardware; firmware; some combination of software, hardware, and/or firmware; and/or other mechanisms for configuring processing capabilities on processor(s). As used herein, the term "module" may refer to any component or set of components that perform a specified functionality attributed to the module. This may include one or more physical processors 2714 during execution of processor readable instructions, the processor readable instructions, circuitry, hardware, storage media, or any other components.

Figure 28:
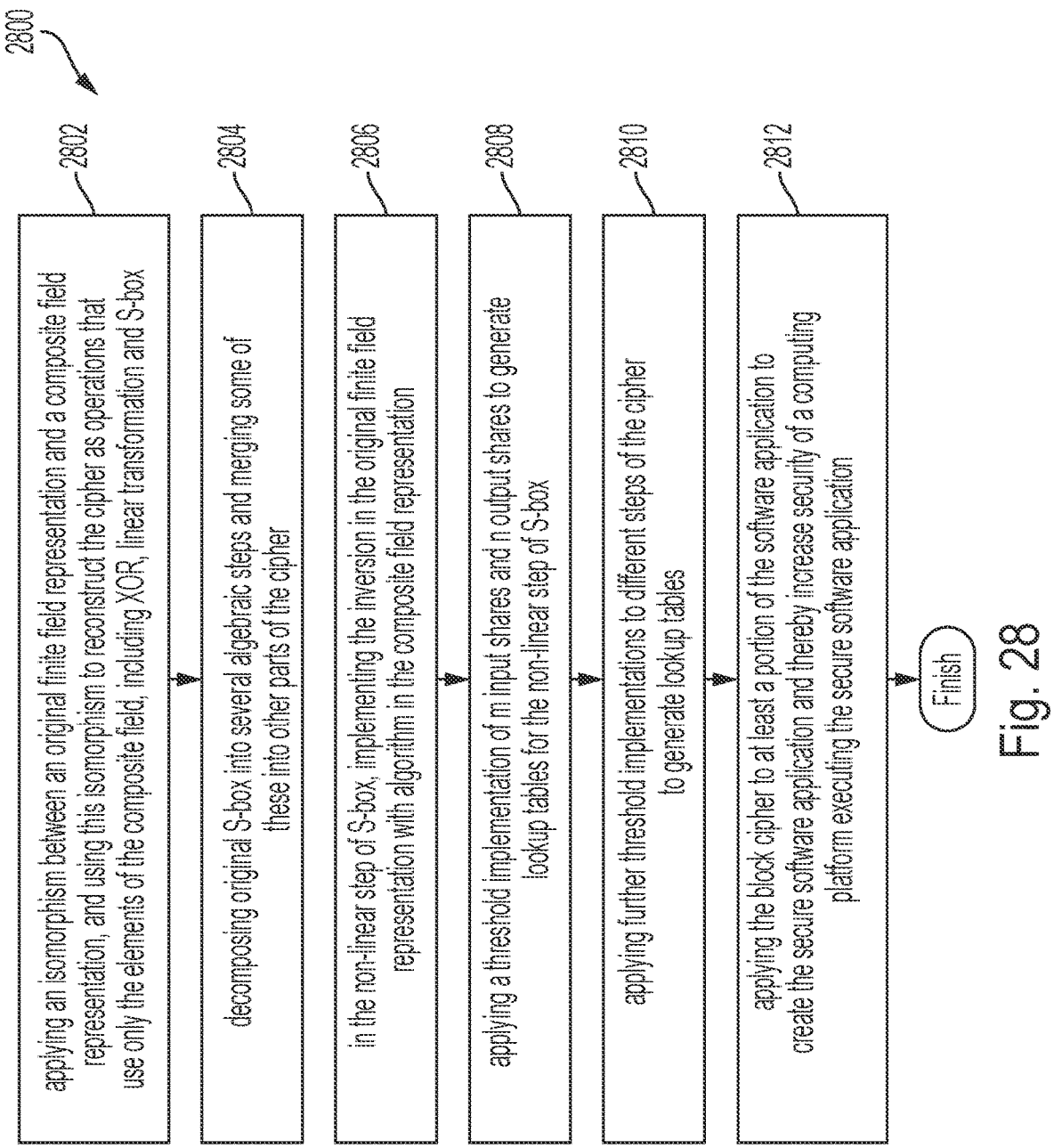
FIG. 28 is a flow chart of a high-level method in accordance with a disclosed implementation.

FIG. 28 illustrates a high-level method for implementing a white-box block cipher in a software application to create a secure software application having the same functionality as the software application in accordance with the disclosed implementations. The process can be accomplished by any computing platform, such as the system shown in FIG. 27. At 2802 an isomorphism is applied between an original finite field representation and a composite field representation, and the isomorphism is used to reconstruct the cipher as operations that use only the elements of the composite field, including XOR, linear transformation and S-box. At 2804 the original S-box is decomposed into several algebraic steps and merging some of these into other parts of the cipher. At 2806, in the non-linear step of S-box, the inversion in the original finite field representation is implemented with an algorithm in the composite field representation. At 2808, a threshold implementation of m input shares and n output shares is applied to generate lookup tables for the non-linear step of S-box. At 2810, further threshold implementations are applied to different steps of the resulting cipher to generate lookup tables. At 2812 the resulting block cipher is applied to at least a portion of the software application to create the secure software application and thereby increase security of a computing platform executing the secure software application.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. Further, features may be added or removed from the implementations to correspond to the specific application.

What is claimed:

1. A method for implementing a block cipher algorithm in a software application to create a secure whitebox protected software application having the same functionality as the software application, the block cipher including a non-linear S-box step, and other linear algebraic steps, the method comprising:
   re-expressing an S-box of the block cipher algorithm to hide and protect cryptographic keys used by the block cipher algorithm by:
      decomposing the S-box based on its field, into a linear part including only linear steps and a non-linear part including non-linear steps and linear steps;
      merging the linear part of the S-box with a preceding operation and creating a first set of lookup tables;
      applying threshold implementations and masks to the first set of lookup tables;
      obfuscating the non-linear part of the S-box by, for each round of the block cipher algorithm, creating a T-box comprising a second set of lookup tables by;
         adding one of the cryptographic keys into the non-linear part of the S-Box;
         applying an isomorphism to map the inversion computation corresponding to the S-box into a composite field to obtain a result that uses only elements of the composite field which include XOR, linear transformation and an inversion computation;
         combining a threshold implementation and masks with a last step of the inversion computation in the composite field of the S-box;
         mapping the result of the step of combining the threshold implementation step back into an original field of the S-box; and
   creating a third set of lookup tables comprising all non-S-box operations of the block cipher algorithm;
   applying further threshold implementations selectively to the third set of lookup tables and masks to the first, second, and third set of the lookup tables of the block cipher to generate and further obfuscate the first, second, and third set of lookup tables, whereby the inputs and outputs of all lookup tables of the first second, and third sets of lookup fables are obfuscated and the distribution of the masked values are uniform and independent of the original inputs; and
   applying the block cipher to at least a portion of the software application to create the secure whitebox protected software application and thereby increase security of a computing platform executing the secure whitebox protected software application.

2. The method of claim 1, wherein the composite field comprises two 4-bit elements.

3. The method of claim 1, wherein the isomorphism is constructed from elements in $GF(2^8)$ to the composite field $GF(2^4)^2$ for the S-box and the threshold implementation is applied to the masks.

4. The method of claim 1, wherein the threshold implementation generates the masks.

5. The method of claim 4, wherein the masks are associated with one another through an inverted tree structure.

6. A system for implementing a block cipher algorithm in a software application to create a secure whitebox protected software application having the same functionality as the software application, the block cipher including a non-linear S-box step, and other linear algebraic steps, the system comprising:
   at least one processor; and
   at least one memory storing instructions which, when executed by the at least one processor, cause the at least one processor to carry out the method of:
      re-expressing the S-box of the block cipher algorithm to hide and protect cryptographic keys used by the algorithm by:
         decomposing the S-box based on its field, into a linear part including only linear steps and a non-linear part including non-linear steps and linear steps;
         merging the linear part of the S-box with a preceding operation and creating a first set of lookup tables;
         applying threshold implementations and masks to the first set of lookup tables;
         obfuscating the non-linear part of S-box by, for each round of the block cipher algorithm, creating a T-box comprising a second set of lookup tables by;
            adding one of the cryptographic keys into the non-linear part of the S-Box;
            applying an isomorphism to map the inversion computation corresponding to the S-box into a composite field to obtain a result that uses only the elements of the composite field which include XOR, linear transformation and inversion;
            combining a threshold implementation and masks with the last step of the inversion computation in the composite field of the S-box;
            mapping the result of the step of combining the threshold implementation step back into the original field of the S-box; and
      creating a third set of lookup tables comprising all non-S-box operations of the block cipher algorithm;
      applying further threshold implementations selectively to the third set of lookup tables and masks to the first, second, and third set of the lookup tables of the block cipher to generate and further obfuscate the first, second, and third set of lookup tables, whereby the inputs and outputs of all of the lookup table are obfuscated and the distribution of the masked values are uniform and independent of the original inputs; and
      applying the block cipher to at least a portion of the software application to create the secure whitebox protected software application and thereby increase security of a computing platform executing the secure whitebox protected software application.

7. The system of claim 6, wherein the composite field comprises two 4-bit elements.

8. The system of claim 6, wherein the isomorphism is constructed from elements in $GF(2^8)$ to the composite field $GF(2^4)^2$ for the S-box and the threshold implementation is applied to the masks.

9. The system of claim 6, wherein the threshold implementation generates the masks.

10. The system of claim 9, wherein the masks are associated with one another through an inverted tree structure.

* * * * *